(12) United States Patent
Koori et al.

(10) Patent No.: US 12,552,965 B2
(45) Date of Patent: Feb. 17, 2026

(54) ADHESIVELY JOINED STRUCTURE AND COMPONENT FOR A VEHICLE

(71) Applicant: NIPPON STEEL CORPORATION, Tokyo (JP)

(72) Inventors: Masumi Koori, Tokyo (JP); Kohei Ueda, Tokyo (JP); Atsushi Morishita, Tokyo (JP); Atsuo Koga, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/824,607

(22) Filed: Sep. 4, 2024

(65) Prior Publication Data

US 2024/0425724 A1 Dec. 26, 2024

Related U.S. Application Data

(63) Continuation of application No. 17/279,933, filed as application No. PCT/JP2019/038179 on Sep. 27, 2019, now Pat. No. 12,110,428.

(30) Foreign Application Priority Data

Sep. 28, 2018 (JP) .................................. 2018-185842

(51) Int. Cl.
*B32B 3/10* (2006.01)
*B32B 15/09* (2006.01)
(Continued)

(52) U.S. Cl.
CPC ................ *C09J 5/10* (2013.01); *B32B 15/09* (2013.01); *B32B 15/092* (2013.01);
(Continued)

(58) Field of Classification Search
None
See application file for complete search history.

(56) References Cited

U.S. PATENT DOCUMENTS

2017/0334171 A1 11/2017 Takada et al.
2019/0084274 A1 3/2019 Hirano et al.

FOREIGN PATENT DOCUMENTS

ES 2 646 760 12/2017
ES 2646760 T3 * 12/2017 ............. C23C 22/34
(Continued)

OTHER PUBLICATIONS

Machine translation of ES-2646760-T3 (Year: 2017).*
(Continued)

*Primary Examiner* — Christopher M Polley
(74) *Attorney, Agent, or Firm* — Birch, Stewart, Kolasch & Birch, LLP

(57) ABSTRACT

This adhesively joined structure includes a first member having a metal portion and a film portion disposed on at least a part of a surface of the metal portion; a second member; an adhesive layer for joining the first member and the second member to each other via the film portion. The film portion includes an organic resin phase containing one or more of a urethane group, an epoxy group, and an ester group; an organic compound phase formed of an organic silicon compound; and optionally an inorganic compound phase formed of an inorganic silicon compound. The total volume percentage of the organic compound phase and the inorganic compound phase to the total volume of the film portion is 16 vol % to 84 vol %. The volume percentage of the organic compound phase to the total volume of the film portion is 16 vol % to 84 vol %. The volume percentage of the inorganic compound phase to the total volume of the film portion is limited to 10 vol % or less. The organic silicon compound includes a Si—C bond; and a Si—O bond or a Si—OH bond or a combination thereof.

16 Claims, 3 Drawing Sheets

(51) Int. Cl.
  *B32B 15/092* (2006.01)
  *B32B 15/095* (2006.01)
  *B32B 15/18* (2006.01)
  *C09J 5/10* (2006.01)

(52) U.S. Cl.
  CPC ............ *B32B 15/095* (2013.01); *B32B 15/18* (2013.01); *B32B 2605/00* (2013.01)

(56) References Cited

FOREIGN PATENT DOCUMENTS

| WO | WO-2011016570 A1 * | 2/2011 | ........... C09D 167/00 |
| WO | WO 2016/076344 A1 | 5/2016 | |
| WO | WO 2017/169571 A1 | 10/2017 | |

OTHER PUBLICATIONS

Machine translation of WO-2011016570-A1 (Year: 2011).*
"Adhesives-Determination of tensile lap-shear strength of rigid-to-rigid bonded assemblies", JIS K 6850, 1999, total 7 pages.
"Aluminium and aluminium alloy sheets, strips and plates", JIS H 4000, 2006 (Revised on 2014), total 46 pages.
"Cold-reduced carbon steel sheet and strip", JIS G 3141, 2017, total 25 pages.
"Electrolytic zinc-coated steel sheet and strip", JIS G 3313, 2015, total 45 pages.
"Hot-dip zinc-coated steel sheet and strip", JIS G 3302, 2019, total 33 pages.
"Hot-rolled mild steel plates, sheet and strip", JIS G 3131, 2018, total 9 pages.
"Hot-rolled steel plates, sheet and strip for automobile structural uses", JIS G 3113, 2018, total 8 pages.
"Metallic materials—Tensile testing—Method of test at room temperature", JIS Z 2241, 2011, total 23 pages.
Corrected Notice of Allowance issued in U.S. Appl. No. 17/279,933, dated Jul. 26, 2024.
Non-Final Office Action issued in U.S. Appl. No. 17/279,933, dated Nov. 15, 2023.
Notice of Allowance issued in U.S. Appl. No. 17/279,933, dated Jun. 5, 2024.

* cited by examiner

ADHESIVELY JOINED STRUCTURE AND COMPONENT FOR A VEHICLE

This application is a Continuation of co-pending application Ser. No. 17/279,933, filed on Mar. 25, 2021, which is the National Stage Application under 35 U.S.C. § 371 of International Application No. PCT/JP2019/038179, filed on Sep. 27, 2019, which claims the benefit under 35 U.S.C. § 119(a) to Japanese Patent Application No. 2018-185842, filed on Sep. 28, 2018, all of which are hereby expressly incorporated by reference into the present application.

TECHNICAL FIELD OF THE INVENTION

The present invention relates to an adhesively joined structure and a component for a vehicle.

RELATED ART

In the industrial field of transportation equipment such as vehicles, the application of an adhesive in joining between members is increasing for the purpose of improving vehicle body stiffness, assisting in welded part fracture, joining dissimilar materials, and the like. Since a significant improvement in performance can be expected by joining the members to each other using the adhesive, this is important as a method for reducing the weight of vehicle bodies. For this reason, in developing adhesively joined structures using an adhesive between metal members or between a metal member and another material as vehicle body components, various studies have been performed for the purpose of improving the joining strength between the members.

For example, the following Patent Document 1 proposes a technique of using an aluminum alloy material in which a predetermined oxide film is provided on the surface of an aluminum alloy substrate and a film having a siloxane bond is provided on the oxide film is used, and then joining such aluminum alloy materials to each other or joining such an aluminum alloy material with another member via an adhesive resin.

Additionally, the following Patent Document 2 proposes a technique of using a chemical treatment metal sheet having a chemical treatment film containing a water soluble resin and a lubricant having a carbon-oxygen bond formed on the surface of a metal substrate, and joining the chemical treatment metal sheet with the resin layer via an adhesive layer.

PRIOR ART DOCUMENT

Patent Document

[Patent Document 1] PCT International Publication WO2016/076344
[Patent Document 2] PCT International Publication No. WO2017/169571

DISCLOSURE OF THE INVENTION

Problems to be Solved by the Invention

Meanwhile, in a case where an adhesive is applied, deterioration of component performance due to deterioration of the adhesive (decrease in adhesion) is unavoidable. This point applies to any of the techniques disclosed in Patent Document 1 and Patent Document 2. For this reason, there is a case where it is difficult to realize a long-term guarantee for the application of the adhesive in the actual environment and the application is limited or the design may be made in anticipation of deterioration depending on the part.

Thus, the present invention is an invention made in view of the above problems, and an object of the present invention is to provide an adhesively joined structure and a component for a vehicle, which are manufactured by joining a metal member and another member with an adhesive and having excellent bonding durability.

Means for Solving the Problem

The present inventors have studied the cause of the decrease in the adhesion between the metal member and the adhesive layer and have found that the causes are entering of water into an interface between the metal member and the adhesive layer and corrosion of the surface of the metal member. From this, the present inventors investigated a relationship between the configuration of a film portion formed on the metal member and the water entering the bonding interface in order to suppress the entering of water into the interface between the metal member and the adhesive layer. As a result, the inventors have found that a film portion containing a substance capable of generating a strong chemical bond with the metal member and a substance having high affinity with the resin of the adhesive constituting the adhesive layer is provided between the metal member and the adhesive layer, so that the entering of water into the bonding interface between the metal member and the adhesive layer can be more reliably suppressed and the bonding durability is improved, and have conceived the present invention.

The summary of the present invention completed on the basis of the above findings is as follows.

(1) An adhesively joined structure including a first member having a metal portion and a film portion disposed on at least a part of a surface of the metal portion; a second member; an adhesive layer for joining the first member and the second member to each other via the film portion, the film portion includes an organic resin phase containing one or more of a urethane group, an epoxy group, and an ester group; an organic compound phase formed of an organic silicon compound; and optionally an inorganic compound phase formed of an inorganic silicon compound, the total volume percentage of the organic compound phase and the inorganic compound phase to the total volume of the film portion is 16 vol % to 84 vol %, the volume percentage of the organic compound phase to the total volume of the film portion is 16 vol % to 84 vol %, the volume percentage of the inorganic compound phase to the total volume of the film portion is limited to 10 vol % or less, and an organic silicon compound includes a Si—C bond; and a Si—O bond or a Si—OH bond or a combination thereof.

(2) The adhesively joined structure described in (1) in which the total volume percentage of the organic compound phase and the inorganic compound phase is 20 vol % to 80 vol %.

(3) The adhesively joined structure described in (2) in which the organic resin phase is resin particles containing one or more of the urethane group, the epoxy group, and the ester group, the average particle size of the resin particles is 20 nm or more to less than 200 nm, and an area percentage of the resin particles is 20% to 80% with respect to a cross sectional area of the film portion in a cross section taken in a thickness direction of the film portion.

(4) An adhesively joined structure described in any one of claims 1 to 3 in which, when the film portion is analyzed by a time-of-flight secondary ion mass spectrometry while the film portion is Ar-spattered from the adhesive layer side toward the metal portion side to include an optional point of an interface between the metal portion and the film portion, peaks corresponding to S—O-Me bonds, which are bonds with a metal element Me constituting the metal portion, were observed, and a value obtained by dividing a count value of the peaks indicating the S—O-Me bonds by a total value of all the secondary ion count numbers detected in a mass scanning range m/z=0 to 300 is $1.0 \times 10^{-3}$ or more.

(5) The adhesively joined structure described in (1) to (4) in which the average thickness of the film portion is 0.2 μm to 1.5 μm per one side of the first member.

(6) The adhesively joined structure described in any one of (1) to (5) in which a resin of an adhesive constituting the adhesive layer has a common chemical structure with a resin constituting the organic resin phase in the film portion.

(7) The adhesively joined structure described in any one of (1) to (6) in which the adhesive layer contains an epoxy resin-based adhesive or a urethane resin-based adhesive or a combination thereof.

(8) The adhesively joined structure described in any one of (1) to (7) in which the metal portion is a steel.

(9) The adhesively joined structure described in any one of (1) to (8) in which the metal portion is a zinc-plated steel sheet.

(10) The adhesively joined structure described in any one of (1) to (9) in which the metal portion is a galvannealed steel sheet having a tensile strength of 590 MPa or more.

(11) The adhesively joined structure described in any one of (1) to (9) in which the metal portion is a galvannealed steel sheet having a tensile strength of 980 MPa or more.

(12) The adhesively joined structure described in any one of (1) to (11) in which the first member and the second member are further joined by a second joining.

(13) The adhesively joined structure described in (12) in which the second joining is spot welding.

(14) A component for a vehicle including the adhesively joined structure described in any one of (1) to (13).

Effects of the Invention

As described above, according to the above aspects of the present invention, it is possible to provide the adhesively joined structure manufactured by joining a metal member and another member with an adhesive and having excellent bonding durability, and the component for a vehicle including the adhesively joined structure.

EMBODIMENTS OF THE INVENTION

Figure 1:
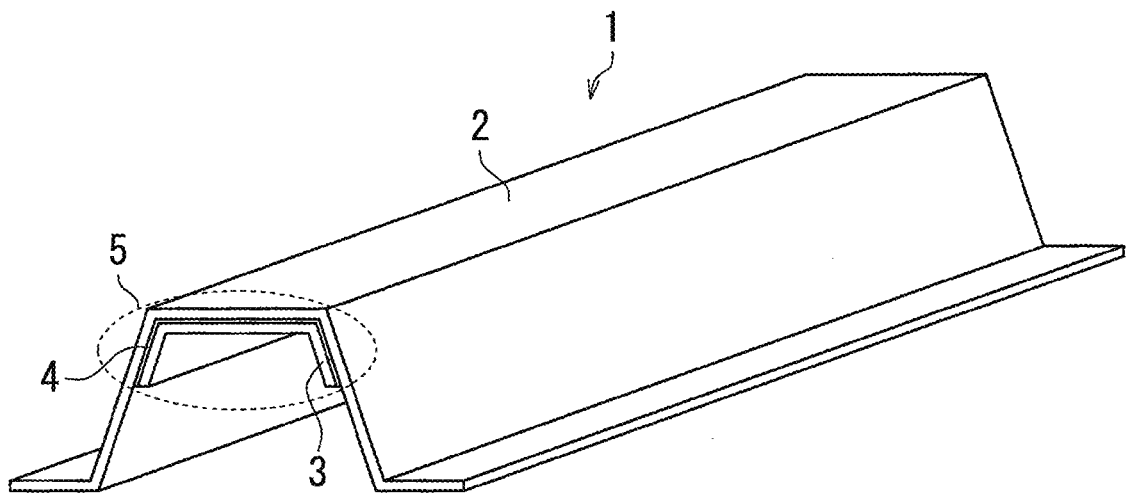
FIG. 1 is a schematic perspective view of an adhesively joined structure according to an embodiment of the present invention.

Preferred embodiments of the present invention will be described in detail below with reference to the accompanying drawings. In addition, in the present specification and drawings, components having substantially the same functional configuration are designated by the same reference numerals to omit duplicate description.

Configuration of Adhesively Joined Structure

Figure 2:
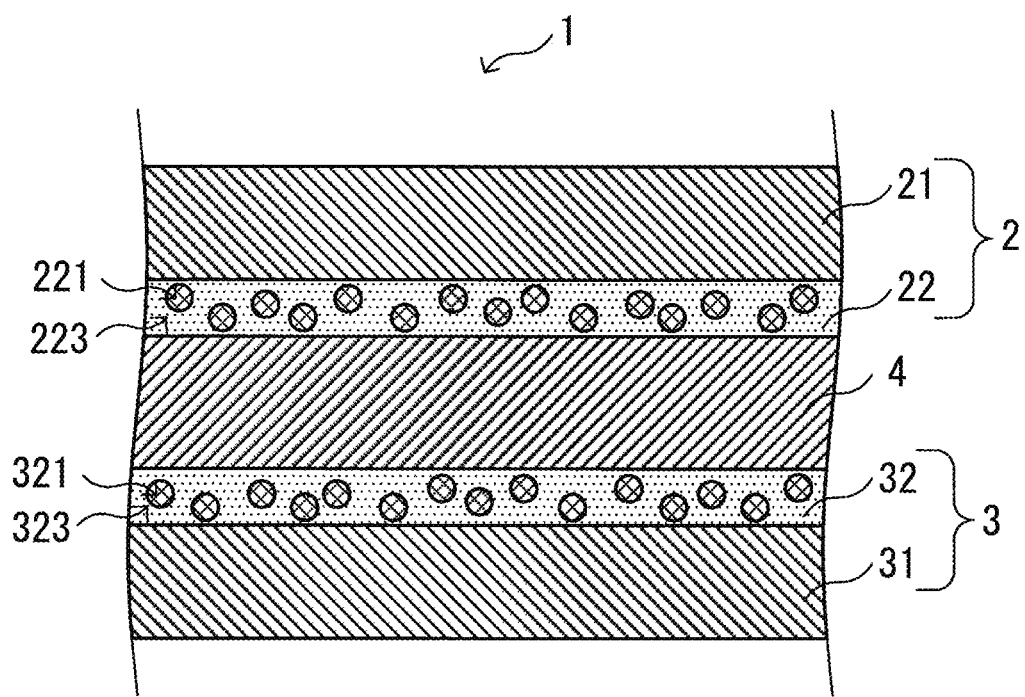
FIG. 2 is a partially enlarged cross sectional view of a bonding region of the adhesively joined structure illustrated in FIG. 1.

FIG. 1 is a schematic perspective view of an adhesively joined structure according to an embodiment of the present invention, and FIG. 2 is a partially enlarged cross sectional view of a bonding region of the adhesively joined structure illustrated in FIG. 1.

The adhesively joined structure 1 illustrated in FIG. 1 has a first member 2 and a second member 3. The first member 2 is a so-called hat-type metal member. That is, the first member 2 includes a web portion, a pair of standing wall portions connected to both side edges of the web portion in a width direction, and a pair of flange portions connected to the standing wall portions and is a metal member of which the cross-cross sectional shape perpendicular to a longitudinal direction is hat-type. The web portion has a rectangular shape that is long in one direction. Also, the second member 3 has a shape along the inside of the web portion of the first member 2 and is joined to the first member 2 via an adhesive layer 4 in a bonding region 5 inside the web portion. Here, the inside of the web portion means a region surrounded by the web portion and the standing wall portions.

In addition, in order to facilitate a description of the configuration of the adhesively joined structure according to the present embodiment, a description will be made on the premise that the first member 2 has a hat type in FIG. 1. However, as will be described below, of course, the respective members constituting an adhesively joined structure in the embodiment are not limited to the shapes of the illustrated aspect. Additionally, in the present embodiment, at least the first member 2 may be a metal member. However, in the following description, a case where both the first member 2 and the second member 3 are metal members having metal portions will be described as an example. Hereinafter, the configuration in the bonding region 5 will be described with reference to FIG. 2.

First Member 2

The first member 2 has a metal portion 21 and a film portion 22 formed on at least a part of the surface of the metal portion 21. Hereinafter, the metal portion 21 will be described.

Metal Portion 21

Examples of the material of the metal portion 21 include iron, titanium, aluminum, magnesium, and alloys thereof. Here, examples of the alloys include iron-based alloys (including stainless steel), Ti-based alloys, Al-based alloys, Mg alloys, and the like. The material of the metal portion 21 is preferably an steel material (steel), an iron-based alloy, titanium, and aluminum, and more preferably an steel material having a higher tensile strength than other metal species. Examples of such steel material include steel materials standardized in the Japanese Industrial Standards (JIS) and the like and may include carbon steel, alloy steel, and high tensile strength steel used for general structures and mechanical structures. Specific examples of such steel materials include cold-rolled steels, hot-rolled steels, hot-rolled steel sheet materials for vehicle structures, hot-rolled high tensile strength steel sheet materials for vehicle processing, cold-rolled steel sheet materials for vehicle structures, cold-rolled high tensile strength steel sheet materials for vehicle structures, high tensile strength steels that are generally referred to as hot stamp materials subjected to quenching during hot working, and the like. The components of such steel materials are not particularly limited, but may contain one or two or more of Si, Mn, S, P, Al, N, Cr, Mo, Ni, Cu, Ca, Mg, Ce, Hf, La, Zr, and Sb in addition to Fe and C. One or two or more of these additive elements can be appropriately selected in order to obtain the required material strength and formability, and the amounts thereof can also be appropriately adjusted.

Additionally, when the material of the metal portion 21 is an aluminum alloy, the weight of the member can be reduced, which is suitable. Examples of the aluminum alloy include aluminum alloys containing one or two or more of Si, Fe, Cu, Mn, Mg, Cr, Zn, Ti, V, Zr, Pb, and Bi, and for example, generally known aluminum alloys such as 1000 series, 2000 series, 3000 series, 4000 series, 5000 series, 6000 series, and 7000 series described in the above JIS H4000: 2006 are mentioned as the material of the metal portion 21. The 5000 series and 6000 series, which have strength and formability, are suitable as the metal portion 21. As the magnesium alloy, magnesium alloys containing one or two or more of Al, Zn, Mn, Fe, Si, Cu, Ni, Ca, Zr, Li, Pb, Ag, Cr, Sn, Y, Sb, and other rare earth elements are mentioned as the material of the metal portion 21, and generally known magnesium alloys such as an AM series containing Al, which are described in the ASTM standard, an AZ series containing Al and Zn, and a ZK series containing Zn can be used. In addition, in a case where the metal portion 21 has a plate shape, the metal portion 21 may be formed.

In a case where the material of the metal portion 21 is an steel material, the steel material may be subjected to any surface treatment. Here, the surface treatment includes, for example, various kinds of plating treatment such as zinc plating, aluminum plating, and tin plating, chemical treatment such as zinc phosphate treatment, chromate treatment, and chromate-free treatment, physical surface roughening treatment such as sandblasting, and chemical surface roughening treatment such as chemical etching but is not limited to these. Additionally, a plurality of kinds of surface treatment may be applied. As the surface treatment, it is preferable that at least a treatment for the purpose of imparting antirust properties is performed.

Particularly, plating steels subjected to plating treatment among the steel materials are preferable as the metal portion 21 due to excellent corrosion resistance. Examples of the plating steels, which are particularly preferable as the metal portion 21, include zinc-plated steel sheets, Ni-plated steel sheets, alloyed Ni-plated steel sheets, which are alloyed by heat-treating the Ni-plated steel sheets and diffusing Fe in Ni plating, Al-plated steel sheets, tin-plated steel sheets, chrome-plated steel sheets, and the like.

Since the zinc-plated steel sheets of the various plated steel sheets as described above have excellent corrosion resistance, the zinc-plated steel sheets are suitable as the metal portion 21. Particularly, in the galvannealed steel sheets in which a steel sheet is zinc-plated and then alloyed and iron is diffused during the zinc plating, the decrease in strength of the adhesive over time is further suppressed. Therefore, the steel sheets are more suitable as the metal portion 21.

Meanwhile, in the galvannealed steel sheets, in a case where a hard alloy layer (generally referred to as a capital Γ layer) is present in a part and an adhesive (for example, a structural adhesive) having high bonding strength is used, there is a possibility that the galvannealed steel sheets are distorted and alloy layers thereof are fractured, so that the original bonding strength is not obtained. However, the present inventors have found that, when a high-strength galvannealed steel sheet is used as the metal portion 21, it is possible to suppress the fracture of a plated alloy layer and increase the bonding strength between the first member 2 and the second member 3.

It is considered that this is because the high strength steel sheet is less likely to be distorted in a case where stress is loaded to the adhesively joined structure 1. That is, generally, in a case where low-strength steel sheets are bonded to each other, the steel sheets are also distorted in addition to the adhesive when stress such as tensile stress or shear stress is generated in the steel sheets. The distortion is concentrated particularly at an end portion of a bonding part. As a result, a plated alloy layer of a distortion concentration portion is fractured, and exfoliation occurs at an early stage. In contrast, in a case where a high strength steel sheet is used, the distortion due to a loaded stress is small. Therefore, the distortion concentration at the end portion of the bonding part is prevented. As a result, it is possible to suppress the fracture of the plated alloy layer at the bonding part and receive the stress in the entire adhesive layer. Particularly, in a galvannealed steel sheet having a tensile strength of 590 MPa or more, the bonding strength between the first member 2 and the second member 3 can be further increased. Moreover, in a galvannealed steel sheet having a tensile strength of 980 MPa or more, the bonding strength between the first member 2 and the second member 3 can be further increased.

Therefore, as the metal portion 21, the high-strength galvannealed steel sheet, for example, a galvannealed steel sheet having a tensile strength of 590 MPa or more is preferably used, and a galvannealed steel sheet having a tensile strength of 980 MPa or more is more preferably used. Accordingly, the bonding strength between the first member 2 and the second member 3 can be further increased. In this case, when the adhesively joined structure 1 is stressed, it is possible to receive the stress in the entire adhesive layer 4. Therefore, the effect of bonding durability in the adhesively joined structure according to the present embodiment described below can be further obtained. In addition, the tensile strength of the steel sheets can be measured according to JIS Z2241: 2011.

Hereinafter, the galvanized steel sheets and the galvannealed steel sheets will be described in detail.

As the steel sheets that are base materials of the galvanized steel sheets and the galvannealed steel sheets, generally known steel sheets can be used. As such steel sheets, for example, hot-rolled mild steel sheets and steel strips described in JIS G3131: 2018, hot-rolled steel sheets and steel strips for a vehicle described in JIS G3113: 2018, cold-rolled steel sheets and steel strips described in JIS G3141: 2017, and the like can be used. As the steel sheets serving as the base materials, as described above, it is more suitable to use high strength steel sheets for vehicle applications, or it is much more suitable to use high strength steel sheets having a tensile strength of 590 MPa or more and high strength steel sheets having a tensile strength of 980 MPa or more.

It is preferable that such high strength steel sheets contain 0.050% by mass to 0.400% by mass of C (carbon), 0.10% by mass to 2.50% by mass of Si (silicon), and 1.20% by mass to 3.50% by mass of Mn (manganese) and the remainder has a composition of Fe (iron) and impurities. Additionally, it is more preferable that such high strength steel sheets contain C, Si, and Mn in the above contents and contains P (phosphorus): 0.100% by mass or less, S (sulfur): 0.0100% by mass or less, Al (aluminum): 1.200% by mass or less, and N (nitrogen): 0.0100% by mass or less instead of a part of the remainder Fe.

Hereinafter, the chemical components (composition) of steel sheets constituting the high strength steel sheets will be described in detail.

C: 0.050% by Mass to 0.400% by Mass

C is an essential element for forming full hard structure, such as martensite, tempered martensite, bainite, and residual austenite and improving the strength of the steel sheets. Thus, in the present embodiment, the amount of C is preferably 0.050% by mass or more in order to obtain a tensile strength of 590 MPa or more or 980 MPa or more. In order to further increase the tensile strength, the amount of C is more preferably 0.075% by mass or more. On the other hand, when the amount of C is excessively increased, the weldability deteriorates. Therefore, the amount of C is preferably 0.400% by mass or less and more preferably 0.300% by mass or less.

Si: 0.10% by Mass to 2.50% by Mass

Si is an element that has the working effects of ensuring the elongation of the steel sheets and improving the strength without significantly impairing the workability. Thus, in the present embodiment, the amount of Si is preferably 0.10% by mass or more in order to sufficiently ensure the workability and strength. In order to more reliably ensure the workability and strength, the amount of Si is more preferably 0.45% by mass or more. On the other hand, when the amount of Si is excessively increased, the toughness decreases and the workability deteriorates. Therefore, the amount of Si is preferably 2.50% by mass or less and more preferably 2.30% by mass or less.

Mn: 1.20% by Mass to 3.50% by Mass

Mn is an element having the same working effects as Si. Thus, in the present embodiment, the amount of Mn is preferably 1.20% by mass or more in order to sufficiently ensure the workability and strength. In order to more reliably ensure the workability and strength, the amount of Mn is more preferably 1.50% by mass or more. On the other hand, when the amount of Mn is excessively increased, the weldability deteriorates. Therefore, the amount of Mn is preferably 3.50% by mass or less and more preferably 3.30% by mass or less.

P: 0.100% by Mass or Less

P is an element that embrittles the steels, and when the amount of P exceeds 0.100% by mass, troubles such as cracking of cast slabs are likely to occur. For that reason, the amount of P is preferably 0.100% by mass or less and more preferably 0.050% by mass or less. On the other hand, when the amount of P is less than 0.001% by mass, the manufacturing cost is significantly increased. Therefore, the amount of P is preferably 0.001% by mass as a lower limit value thereof.

S: 0.0100% by Mass or Less

Since S is an element that deteriorates the workability such as ductility and bendability, the amount of S is preferably 0.0100% by mass or less. Additionally, since S is also an element that deteriorates weldability, it is more preferable to limit the amount of S to 0.0080% by mass or less. On the other hand, when the amount of S is less than 0.0001% by mass, the manufacturing cost is significantly increased. Therefore, the amount of S is preferably 0.0001% by mass as a lower limit value thereof.

Al: 1.200% by Mass or Less

Al is an element that embrittles the steels, and when the Al content exceeds 1.200% by mass, troubles such as cracking of cast slabs are likely to occur. For that reason, the Al content is preferably 1.200% by mass or less. Additionally, since the weldability deteriorates when the Al content increases, the Al content is more preferably 1.100% by mass or less. On the other hand, the lower limit of the Al content may not be particularly specified. However, Al is an unavoidable impurity present in a trace amount in raw material, and the manufacturing cost is significantly increased in order to set the content to less than 0.001% by mass. For that reason, the Al content is preferably 0.001% by mass as a lower limit value thereof.

N: 0.0100% by Mass or Less

N is an element that forms coarse nitrides and deteriorates the workability such as ductility and bendability. When the N content exceeds 0.0100% by mass, the workability remarkably deteriorates. Therefore, the N content is preferably 0.0100% by mass or less. Additionally, when the N content is excessive, this may cause the generation of blow holes during welding. Therefore, the lower the content, the better. From these viewpoints, the N content is more preferably 0.0090% by mass or less. On the other hand, the lower limit of the N content is not particularly limited. However, setting the N content to less than 0.0005% by mass causes a significant increase in manufacturing cost. From this, the lower limit of the N content is preferably 0.0005% by mass or more.

The high strength steel sheets preferably used in the present embodiment may contain other elements in addition to the above, as necessary.

For example, in order to further increase the strength of the steel sheets, Cr (chromium), Mo (molybdenum), Ni (nickel), or Cu (copper), or any combination thereof may be contained in place of a part of the remainder Fe. The upper limit of the total amount of Cr (chromium), Mo (molybdenum), Ni (nickel), or Cu (copper), or any combination thereof may be 1.20% by mass.

Additionally, in order to further increase the strength of the steel sheets, Nb (niobium), Ti (titanium), or V (vanadium), or any combination thereof may be contained instead of a part of the remainder Fe. The upper limit of the total amount of Nb (niobium), Ti (titanium), or V (vanadium), or any combination thereof may be 0.200% by mass.

Moreover, since B (boron) is an element effective for increasing the strength, B may be contained in place of a part of the remainder Fe. The upper limit of the amount of B may be 0.0075% by mass.

Additionally, in order to increase the formability of the steel sheets, Ca (calcium), Mg (magnesium), Ce (cerium), Hf (hafnium), La (lanthanum), Zr (zirconium), Sb (antimony), or REM (rare earth element), or any combination thereof may be contained instead of a part of the remainder Fe. The upper limit of the total amount of Ca (calcium), Mg (magnesium), Ce (cerium), Hf (hafnium), La (lanthanum), Zr (zirconium), Sb (antimony), or REM (rare earth element), or any combination thereof may be 0.1000% by mass.

In the chemical components of the high strength steel sheets preferably used in the present embodiment, the remainder of the respective elements described above is Fe and impurities.

In addition, the above-described Cr, Mo, Ni, Cu, Nb, Ti, V, B, Ca, Mg, Ce, Hf, La, Zr, Sb, and REM are all allowed to contain a trace amount less than the lower limit value as the impurities.

As described above, such high strength steel sheets are more suitable as the metal portion 21 because these steel sheets are excellent in corrosion resistance when being subjected to the zinc plating. Examples of such zinc-plated steel sheets include electrolytic zinc-plated steel sheets according to JIS G3313 and galvanized steel sheets described in JIS G3302, and the like.

In the case of the electrolytic zinc-plated steel sheets, steel sheets plated only with zinc (generally referred to as EG) may be used, or zinc-nickel electroplated steel sheets may be used. Additionally, as the galvanized steel sheets, those generally referred to as GI containing 0.2% of Al in a zinc-plated layer may be used, or steel sheets generally referred to as Zn—Al alloy-plated steel sheets containing 1 to 10% of Al in a zinc-plated layer may be used. Moreover, steel sheets generally referred to as Zn—Al—Mg alloy-plated steel sheets containing Al: 1 to 10% and Mg: 1 to 15% in a zinc-plated layer may be used.

When such zinc-plated layer is a hot-dip galvannealed layer containing Fe: 7 to 15% by mass and Al: 0.05 to 0.5% by mass and the remainder formed of Zn and impurities, the bonding strength of the adhesive does not easily decrease over time, and the steel sheets are more suitable as the metal portion 21. In the present embodiment, the hot-dip galvannealed layer is a plated layer mainly formed of an Fe—Zn alloy in which Fe in steel can be diffused during the Zn plating by an alloying reaction. The amount of Fe is not particularly limited. However, when the amount of Fe in the hot-dip galvannealed layer is less than 7% by mass, a soft Zn—Fe alloy is formed on the plated surface and deteriorates the press formability. When the amount of Fe exceeds 15% by mass, a brittle alloy layer develops excessively at a base steel interface and the plating adhesion deteriorates. For that reason, the amount of Fe in the hot-dip galvannealed layer is appropriately 7 to 15% by mass. Additionally, when hot dip galvanizing is generally continuously performed, Al is added to a plating bath for the purpose of controlling the alloying reaction in the plating bath. Therefore, 0.05 to 0.5% by mass of Al is contained in the plating. Additionally, in the alloying process, the elements added to the steel are also diffused simultaneously with the diffusion of Fe. Therefore, these elements are also included in the plating.

An example of a manufacturing method for obtaining the galvanized steel sheets as described above will be shown below. However, the high-strength galvanized steel sheets as described above may be manufactured by methods other than the manufacturing method exemplified below, and the respective conditions described below are merely examples of suitable ones.

The steel sheets serving as the base materials used in such zinc-plated steel sheets are manufactured by hot-rolling slabs or are cold-rolled after hot rolling and then manufactured by annealing as necessary. It is more suitable that such annealing is performed by performing a continuous annealing step. Moreover, such steel sheets can be electroplated on a continuous electroplating line. In the case of the galvanized steel sheets, the galvanized steel sheets are manufacturing by heating such hot-rolled steel sheets or cold-rolled steel sheets in a continuous plating line and then retaining the steel sheets in a heated state (generally, referred to as a reducing furnace) in a reducing atmosphere (a nitrogen gas atmosphere containing 1 to 5% of hydrogen) to reduce an oxide on the surface of each steel sheet (generally referred to as an oxidation-reduction method), then cooling and immersing the steel sheets in a hot-dip galvanizing bath, and pulling up the steel sheets to adjust the amount of plating adhesion amount by gas wiping. As wiping gas, general gases such as air or nitrogen gas can be used. However, nitrogen gas is more suitable because the nitrogen gas can suppress the oxidation of a plated layer. In a case where the galvannealed steel sheets are manufactured, the galvannealed steel sheets are manufactured by adjusting the amount of plating adhesion amount by gas wiping of the present step and then heating the steel sheets to 400 to 500° C. in an alloying furnace to perform an alloying treatment.

Film Portion 22

Next, the film portion 22 will be described.

At least a part of the surface of the first member 2 has the film portion 22. That is, the film portion 22 is formed on at least a part of the surface of the metal portion 21. At least a part of the film portion 22 is in contact with the adhesive layer 4, and the first member 2 is bonded to the second member 3 by the adhesive layer 4 via the film portion 22. The film portion 22 includes an organic resin phase containing a urethane group, an epoxy group, an ester group, or any combination thereof and an organic compound phase formed of an organic silicon compound. The organic silicon compound of the present embodiment includes a Si—C bond. Additionally, the organic silicon compound of the present embodiment includes a Si—O bond or a Si—OH bond or a combination thereof. That is, the organic silicon compound of the present embodiment includes a Si—C bond and a Si—O bond or a Si—OH bond or a combination thereof. Hereinafter, the configuration of the film portion 22 will be described in detail.

As described above, the film portion 22 according to the present embodiment includes the organic resin phase containing one or more of the urethane group, the epoxy group, and the ester group, and the organic compound phase formed of the organic silicon compound. More specifically, as schematically illustrated in FIG. 2, in the film portion 22, the organic resin phase having the specific functional group is mainly present as the resin particles 221 and is constituted of the organic silicon compound, and has a structure in which the resin particles 221 are dispersed in the organic compound phase 223.

Since the organic compound phase 223 formed of the organic silicon compound is present in the film portion 22, a chemical bond referred to as a S—O-Me bond is formed between the elements constituting the metal portion 21. Here, Me indicates a metal element that is a main component of the metal portion 21 (in other words, a metal element of which the content is 50% by mass or more with respect to the total mass of the metal portion 21). For example, in a case where the metal portion 21 is a steel material, the above Me is Fe, and in a case where the metal portion 21 is an aluminum material, the above Me is Al. By forming such a primary bond, a joined state between the metal portion 21 and the film portion 22 becomes stronger, and the adhesion between the metal portion 21 and the film portion 22 is further improved. As a result, a state in which water is less likely to enter the interface between the metal portion 21 and the film portion 22 from the outside is realized. Thereby, in the adhesively joined structure 1 according to the present embodiment, the bonding durability between the metal portion 21 and the film portion 22 can be improved.

In the film portion 22, the total volume percentage of the organic compound phase 223 and the inorganic compound phase is 16 vol % to 84 vol % with respect to the total volume of the film portion 22. When the total volume percentage of the organic compound phase 223 and the inorganic compound phase is less than 16 vol % with respect to the total volume of the film portion 22, there is a case where the S—O-Me bond is not sufficiently formed. When the volume percentage of organic compound phase 223 and the inorganic compound phase exceeds 84 vol % with respect to the total volume of the film portion 22, there is a case where the adhesion between the adhesive layer 4 and the film portion 22 decreases. The total volume percentage of the organic compound phase 223 and the inorganic compound phase is preferably 20 vol % or more and more preferably 30 vol % or more. The total volume percentage of the organic compound phase 223 and the inorganic compound phase is preferably 80 vol % or less and more preferably 70 vol % or less. In a case where the total volume percentage of the organic compound phase 223 and the inorganic compound phase is determined from the cross section of the film portion 22, the total area percentage of the organic compound phase 223 and the inorganic compound phase with respect to the cross sectional area of the film portion 22 is determined to be the total volume percentage of the organic compound phase 223 and the inorganic compound phase.

In the film portion 22, the volume percentage of the organic compound phase 223 is 16 vol % to 84 vol % with respect to the total volume of the film portion 22. When the volume percentage of the organic compound phase 223 is less than 16 vol % with respect to the total volume of the film portion 22, there is a case where the Si—O-Me bond is not sufficiently formed. When the volume percentage of the organic compound phase 223 exceeds 84 vol % the total volume of the film portion 22, there is a case where the adhesion between the adhesive layer 4 and the film portion 22 decreases. The volume percentage of the organic compound phase 223 is preferably 20 vol % or more and more preferably 30 vol %. The volume percentage of the organic compound phase 223 is preferably 80 vol % or less and more preferably 70 vol %. In a case where the volume percentage of the organic compound phase 223 is determined from the cross section of the film portion 22, the area percentage of the organic compound phase 223 with respect to the cross sectional area of the film portion 22 is determined to be the volume percentage of the organic compound phase 223.

The film portion 22 may contain an inorganic compound phase formed of an inorganic silicon compound. The volume percentage of the inorganic compound phase is limited to 10 vol % or less with respect to the total volume of the film portion 22. When the volume percentage of the inorganic compound phase exceeds 10 vol %, there is a case where the adhesion between the metal portion 21 and the film portion 22 decreases. Since the film portion 22 may not contain the inorganic compound phase, the lower limit thereof is 0 vol %. In a case where the film portion 22 contains the inorganic compound, the strength of the film portion 22 is improved. Therefore, the bonding strength is improved. Examples of the inorganic silicon compound constituting the inorganic compound phase include colloidal silica, fumed silica, and the like. In a case where the volume percentage of the inorganic compound phase is determined from the cross section of the film portion, the area percentage of the inorganic compound phase with respect to the cross sectional area of the film portion 22 is determined to be the volume percentage of the inorganic compound phase. The inorganic silicon compound is determined from the constituent elements thereof, for example, by performing elemental analysis with an electron probe microanalyzer (EPMA) in the cross section of the film portion. The volume percentage of the inorganic silicon compound or the organic silicon compound is determined from the obtained SEM image by observing the cross section with an electron scanning microscope (SEM) after the elemental analysis.

Additionally, in the film portion 22, the resin particles 221 are dispersed in the organic compound phase 223, and the resin particles 221 have one or more functional groups among the urethane group, the epoxy group, and the ester group. Since these functional groups are functional groups that are contained in a large amount even in the resin constituting the adhesive, the film portion 22 contains the resin particles 221 having the functional groups as described above. Accordingly, the adhesion at the interface between the film portion 22 and the adhesive layer 4 is improved. As a result, a state in which water is less likely to enter the interface between the film portion 22 and the adhesive layer 4 from the outside is realized. Accordingly, in the adhesively joined structure 1 according to the present embodiment, the bonding durability between the film portion 22 and the adhesive layer 4 can be improved.

As described above, as the film portion 22 contains the organic resin phase and the organic compound phase 223, the adhesion on the two interfaces (the interface between the film portion 22 and the metal portion 21 and the interface between the film portion 22 and the adhesive layer 4) in the film portion 22 can be improved, and the bonding durability of the adhesively joined structure 1 can be improved.

Here, the resin particles 221 constituting the organic resin phase as described above are not particularly limited as long as the resin particles are resin particles having one or more functional groups among the urethane group, the epoxy group, and the ester group. The resin particles 221 may be either a water-dispersible water-based resin dispersed in water or a solvent-based resin dispersed in an organic solvent. However, the resin particles 221 is preferably the water-based resin from the viewpoints of manufacturing cost and environmental suitability. The resin constituting the resin particles 221 is preferably a resin having a main skeleton containing carbon atoms.

Examples of the water-based resin include water-dispersible resins such as urethane resins, epoxy resins, polyester resins, and mixed resins of two or more kinds of these resins. In a case where the polyester resin is used, the molecular weight is preferably 10,000 to 30,000. When the molecular weight is less than 10,000, it may be difficult to ensure sufficient workability. On the other hand, when the resin itself exceeds 30,000, the binding sites of the resin itself, the molecular weight may decrease, and it may become difficult to ensure excellent adhesion to the adhesive layer 4. Additionally, in a case where crosslinking is made using a curing agent such as melamine, the crosslinking reaction may not be sufficiently performed and the performance of the film portion 22 may deteriorate. In the case of a urethane resin, the form of the urethane resin is preferably an emulsion having an emulsion particle size of 10 to 100 nm (preferably 20 to 60 nm). In a case where the emulsion particle size is excessively small, the cost may be high. On the other hand, in a case where the emulsion particle size is excessively large, a gap between the emulsions becomes large when a coating film is applied. Therefore, the barrier property of the film portion 22 may decrease. Examples of the type of the urethane resin include ether-based, polycarbonate-based, ester-based, and the like. These may be used alone or in combination.

On the other hand, examples of the solvent-based resin include polyester resins, urethane resins, epoxy resins, and mixed resins of two or more kinds of these resins.

Here, the resin contained in the film portion 22 may be a crosslinked resin having a crosslinked structure or a non-crosslinked resin having no crosslinked structure. As a crosslinking agent (curing agent) that imparts a crosslinked structure to the resin, melamine, isocyanate, silane compound, zirconium compound, titanium compound and the like are preferable.

The amount of the crosslinking agent added is preferably 5 parts by mass to 30 parts by mass with respect to 100 parts by mass of the resin solid content. When the amount of the crosslinking agent added is less than 5 parts by mass, the crosslinking reaction with the resin decreases, and the performance as a coating film may be insufficient. On the other hand, when the amount of the crosslinking agent added is more than 30 parts by mass, the crosslinking reaction proceeds too much, the film portion 22 may become excessively hard, and the workability may deteriorate. Additionally, in a case where the silane compound, the zirconium compound, or the titanium compound is used as the crosslinking agent, the coating stability may further deteriorate when the amount of the crosslinking agent added is more than 30 parts by mass, which is not preferable.

The particle shape of the resin particles 221 is not particularly limited and may be, for example, a sphere-like shape such as a spherical shape, a pseudo-spherical shape (for example, an elliptical spherical shape, a chicken egg shape, a rugby ball shape, or the like), a polyhedral shape (for example, a soccer ball shape, a dice shape, brilliant-cut shapes of various jewels), an elongated shape (for example, a rod shape, a needle shape, a fibrous shape, or the like), or a planar shape (for example, a flake shape, a flat plate shape, a sheet shape, or the like).

In the film portion 22 according to the present embodiment, the average particle size of the resin particles 221 is preferably 20 nm or more, for example. As the average particle size of the resin particles 221 is 20 nm or more, the affinity with the adhesive layer 4 as described above can be more reliably improved, which is preferable. The average particle size of the resin particles 221 is more preferably 30 nm or more and much more preferably 50 nm or more. On the other hand, as the average particle size of the resin particles 221 is less than 200 nm, it is possible to form more dense resin barrier layer, and it is thereby further improve the adhesion between the film portion 22 and the adhesive layer 4, which is preferable. The average particle size of the resin particles 221 is more preferably 180 nm or less and much more preferably 150 nm or less.

Here, the "average particle size" of the resin particles 221 means the average primary particle size in a case where the resin particles 221 present in the film portion 22 are present alone and means the average secondary particle size representing the particle size of the resin particles 221 at the time of cohesion in a case where the resin particles 221 cohere. The average particle size of the resin particles 221 is preferably determined by the following measurement method.

First, by cutting the part of the adhesively joined structure 1 on which the film portion 22 is disposed, the cross section of the portion is exposed, the cross section of the portion is further polished, and a cross sectional sample in the thickness direction of the first member 2 of the film portion 22 is obtained. Next, the portion of the cross sectional sample of the film portion 22 is observed with a scanning electron microscope to obtain an observation image of the cross section of the film portion 22. Ten resin particles 221 present in the visual field of the observation image are optionally selected, and a diameter equivalent to the area circle of each resin particle 221 is measured. The diameter equivalent to the area circle of the resin particles 221 is the average of 10 resin particles 221.

Here, whether or not the film portion 22 according to the present embodiment has the urethane group, the epoxy group, or the ester group, or any combination thereof can be determined by the following method. Additionally, similarly, whether or not the Si—C bond, the Si—O bond, and the Si—OH bond, or any combination thereof is contained can be determined by the following method.

First, by cutting the part of the adhesively joined structure 1 on which the film portion 22 is disposed by diagonal cutting, the cross section of the portion is exposed, the cross section of the portion is further polished, and a cross sectional sample in the thickness direction of the first member 2 of the film portion 22 is obtained. Next, the portion of the film portion 22 of the cross sectional sample was analyzed by a micro-IR spectroscope, and determination is made on the basis of whether or not a vibration peak derived from the urethane group, the epoxy group, the ester group, the Si—O bond, the Si—C bond, or the Si—OH bond is observed on the infrared absorption spectrum of the obtained film portion 22. Specifically, in the obtained infrared absorption spectrum, the epoxy group is determined to be contained in a case where a peak is observed in the vicinity of 910 $cm^{-1}$, the urethane group is determined to be contained in a case where a peak is observed in the vicinity of 1550 $cm^{-1}$ and in the vicinity of 1740 $cm^{-1}$, and the ester group is determined to be contained in a case where a peak is observed in the vicinity of 1720 to 1740 $cm^{-1}$. The Si—C bond is determined to be included in a case where a peak is observed in the vicinity of 1250 to 1260 $cm^{-1}$, the Si—O bond is determined to be included in a case where a peak is observed in the vicinity of 1000 to 1100 $cm^{-1}$, and the Si—OH bond is determined to be included in a case where a peak is observed in the vicinity of 3650 to 3690 $cm^{-1}$. In addition, as long as the film portion 22 can be sufficiently enlarged, the cutting angle in diagonal cutting may be any angle.

Figure 3:
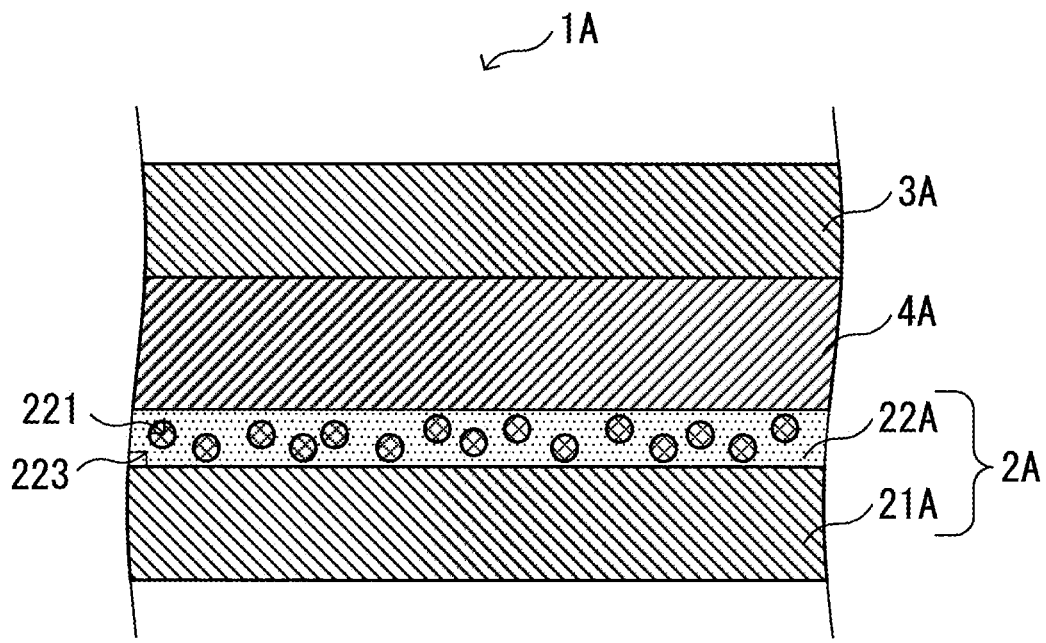
FIG. 3 is a partially enlarged cross sectional view illustrating a bonding region of an adhesively joined structure according to a modification example of the present invention.

Additionally, in the cross section taken in the thickness direction of the film portion 22 according to the present embodiment (for example, in the cross section as illustrated in FIG. 3), it is preferable that the area percentage of the resin particles 221 occupies 16% or more of the cross sectional area of the film portion 22. That is, in the above cross section, the area percentage of the resin particles 221 is preferably 16% or more with respect to the cross sectional area of the film portion 22. As the area percentage of the resin particles 221 is 16% or more, it is possible to more reliably improve the affinity with the adhesive layer 4 as described above. The area percentage of the resin particles 221 in the cross section of the film portion 22 is more preferably 30% or more and much more preferably 40% or more. On the other hand, as the area percentage of the resin particles 221 in the cross section is 84% or less, the affinity between the film portion 22 and the adhesive layer 4 can be further improving while reliably maintaining the adhesion between the film portion 22 and the metal portion 21. The area percentage of the resin particles 221 in the cross section of the film portion 22 is more preferably 80% or less and much more preferably 70% or less.

The area percentage of the resin particles 221 in the cross section of the film portion 22 is preferably determined by the following measurement method. First, by cutting the part of the adhesively joined structure 1 on which the film portion 22 is disposed, the cross section of the portion is exposed, the cross section of the portion is further polished, and a cross sectional sample in the thickness direction of the first member 2 of the film portion 22 is obtained. Next, a thin film sample for TEM observation is produced from the film portion 22 of the cross sectional sample by an FIB-microsampling method and a cryo-FIB-microsampling method, and the obtained thin film sample for TEM observation is observed by using an FE-TEM capable of analyzing a minute region. Five points obtained by dividing the film portion 22 of the cross sectional sample into 5 equal parts in the width direction are observed. At the respective observation points, EDS analysis (element mapping) is performed on the cross section in the vicinity of the interface between a metal portion and an adhesive layer to obtain respective element maps of C, O, and Si. Then, the obtained element maps are binarized for C and other elements, and the average particle sizes and the area percentages of the resin particles in the film portion are calculated.

Additionally, the organic compound phase 223 according to the present embodiment is not particularly limited as long as an organic silicon compound containing the Si—C bond, the Si—O bond, or the Si—OH bond, or any combination thereof is provided. For example, it is preferable to use an organic silicon compound having a glycidoxy group or a mercapto group. By using the organic silicon compound having the glycidoxy group or the mercapto group as the organic silicon compound, it is possible to realize the formation state of the S—O-Me bond as described in detail below in a more reliable and more preferable state, and it is possible to more reliably realize long-term bonding durability. In addition, in addition to the organic silicon compound having the glycidoxy group or the mercapto group, for example, an organic silicon compound having an amino group, a vinyl group, a methacryl group, or the like may be present in the organic silicon compound. However, as a result of the verification by the present inventors, in a case where the organic silicon compound having the amino group, the vinyl group, the methacryl group, or the like are used, it has been clarified that the reaction between the organic silicon compound and the resin constituting the organic resin phase inside the film portion 22 is further promoted than the reaction at the interface between the metal portion 21 and the film portion 22 and it is difficult to obtain the long-term bonding durability. Therefore, from the viewpoint of realizing the long-term bonding durability by preventing the entering of an electrolytic solution such as water, it is preferable to use the organic silicon compound having the glycidoxy group or the mercapto group. In addition, as the organic silicon compound having the glycidoxy group or the mercapto group, a commercially available organic silicon compound that meets the conditions may be used, or an organic silicon compound produced by organic synthesis may be used.

Here, in the film portion 22 according to the present embodiment, it is preferable that the following analysis results are obtained when the film portion is analyzed by the time-of-flight secondary ion mass spectrometry (TOF-SIMS) while the film portion 22 is Ar-spattered from the adhesive layer 4 side toward the metal portion 21 side so as to include an optional point of the interface between the metal portion 21 and the film portion 22. That is, in the analysis results of TOF-SIMS, peaks corresponding to S—O-Me bonds (Me: the metal element constituting the metal portion 21) are observed, and a count value of the peaks indicating the S—O-Me bonds is preferably 15 or more.

Additionally, the intensity (a.u.) is preferably $1.0 \times 10^{-3}$ or more as a total ion correction value (a value obtained by dividing the peak count number of S—O-Me bonds by the total value of detected total secondary ion count numbers). Specifically, the value obtained by dividing the count value of the peaks indicating the S—O-Me bonds by the total value of all the secondary ion count numbers detected in a mass scanning range m/z=0 to 300 (total Ion correction value) is preferably $1.0 \times 10^{-3}$ or more.

Here, the peaks corresponding to the S—O-Me bonds are observed at a characteristic position for each element Me depending on the specific type of the element Me. For example, in the case of Me=Fe, typical peaks corresponding to Si—O—Fe bonds are peaks observed at the position of mass (m/z) 100±0.1 in the analysis result of TOF-SIMS, in the case of Me=Zn, typical peaks corresponding to Si—O—Zn bonds are peaks observed at the position of the mass (m/z) 108±0.1 in the TOF-SIMS analysis results, and in the case of Me=Al, typical peaks corresponding to Si—O—Al bonds are peaks observed at the position of the mass (m/z) 71±0.1 in the TOF-SIMS analysis results.

Such analysis results show that the formation reaction of the S—O-Me bond proceeds efficiently at the interface between the metal portion 21 and the film portion 22, and a certain amount or more of S—O-Me bonds are generated at the interface between the metal portion 21 and the film portion 22. As a certain amount or more of S—O-Me bonds are generated at the interface between the metal portion 21 and the film portion 22, even in a case where the adhesively joined structure 1 is exposed to a wet environment, water can be prevented from entering the interface, between the metal portion 21 and the film portion 22, and the longer-term bonding durability is maintained.

The count value indicating the S—O-Me bonds as described above is more preferably 20 or more and much more preferably 30. The total ion correction value is more preferably $1.3 \times 10^{-3}$ or more and much more preferably $2.0 \times 10^{-3}$.

In addition, the count value of the peaks corresponding to the S—O-Me bonds at the interface between the metal portion 21 and the film portion 22 as described above can be measured as follows. First, by cutting an adhesively joined portion between the metal portion 21 and the film portion 22 from the adhesive layer 4 side toward the metal portion 21 side at an inclination of 5 degrees with an oblique cutting device (SAICAS) and by using the Ar spattering in combination, a sample in which the thickness of an adhesive layer is reduced to about 1 μm is produced. The portion where the thickness of the adhesive layer is reduced to about 1 μm is analyzed by TOF-SIMS from the adhesive layer side toward the metal portion 21 side while performing the Ar spattering. TOF-SIMS measurement is performed after the spattering from the surface to a certain depth with an Ar beam, and then similarly TOF-SIMS measurement is repeated after the Ar spattering, and the distribution in the depth direction is acquired for various elements and bonds. The primary ion species is $Au_3^+$, the acceleration voltage is 30 kV, the spattering rate is about 80 nm/min ($SiO_2$ conversion), and the measurement region is 50 μm×50 μm.

Since a specific mass number is present in each ion, the depth profile of the theoretical mass number of a desired S—O-Me bond is measured in the above TOF-SIMS measurement. From the depth profile of the mass corresponding to the S—O-Me bond, and respective depth profiles of Me ions, which are a main component of the metal portion, and C ions, which are a main component of the resin, the part from a rising portion of the count value of the Me ions and a falling portion of the count value of the C ions to the part where the count number of the C ions is substantially constant is regarded as an interface portion, and a count value corresponding to the S—O-Me bond in such an interface portion is measured.

In addition, the area percentage of the resin particles 221 and the count value of the S—O-Me bonds in TOF-SIMS as described above can be desired ranges by appropriately adjusting the selection and amount of a material serving as a raw material of the organic resin phase and a material serving as a raw material of the organic compound phase 223 and appropriately controlling the surface state of the metal portion 21 when the film portion 22 according to the present embodiment are formed.

Other Components

The film portion 22 may contain other additives in addition to the above components. Examples of other additives include well-known additives such as oxide particles, extender pigments, solid lubricants, antirust agents, leveling agents, viscosity-imparting agents, pigment sedimentation inhibitors, and defoamers.

Average Thickness of Film Portion 22

In the present embodiment, the average thickness of the film portion 22 as described above is preferably 0.2 μm or more per one side of the first member 2 (in other words, per one side of the metal portion 21). By setting the average thickness of the film portion 22 per one side to 0.2 μm or more, the above-described effects by providing the film portion 22 can be more reliably realized. The average thickness of the film portion 22 per one side is more preferably 0.4 μm or more and much more preferably 0.5 μm or more. On the other hand, by setting the average thickness of the film portion 22 per one side to 1.5 μm or less, it is possible to guarantee the conductivity to the metal portion 21 via the film portion 22. For example, it is possible to perform electrodeposition coating on the metal portion 21 via the film portion 22 and perform spot welding on the metal portion 21 via the film portion 22. The average thickness of the film portion 22 per one side is more preferably 1.2 μm or less and much more preferably 1.0 μm or less.

In addition, the average thickness of the film portion 22 can be measured as follows. First, by cutting the part of the adhesively joined structure 1 on which the film portion 22 is disposed in the thickness direction of the film portion 22, the cross section of the portion is exposed, the cross section of the portion is further polished, and a cross sectional sample in the thickness direction of the first member 2 of the film portion 22 is obtained. Next, the portion of the film portion 22 of the cross sectional sample is observed with a scanning electron microscope to obtain an observation image of the cross section of the film portion 22. The thicknesses of the film portion 22 present in the visual field of the observation image are measured at the positions of five points where the visual field is divided into five equal parts in the width direction, and the average value thereof is calculated. The average thickness of the film portion 22 is the average value of the values obtained in the five visual fields. That is, the average thickness of the film portion 22 is the average value of the thicknesses at 25 points in total.

In addition, a known chemical treatment film may be formed in the part of the above-described first member 2 that does not come into contact with the adhesive layer 4.

Second Member 3

In the present embodiment, the second member 3 is a metal member as described above and has a metal portion 31 and a film portion 32 formed on at least a part of the surface of the metal portion 31.

Since the configurations of the metal portion 31 and the film portion 32 can be the same as the configurations of the metal portion 21 and the film portion 22 in the first member 2, respectively, and the same effects as those of the metal portion 21 and the film portion 22 in the first member 2 can be exhibited, the detailed description thereof will be omitted below.

Adhesive Layer 4

The adhesive layer 4 is disposed between the first member 2 and the second member 3 in the bonding region 5 and bonds the first member 2 and the second member 3 to each other.

The adhesive layer 4 is mainly constituted of an adhesive. The above-described effect of the film portion 22 is not impaired depending on the type of adhesive constituting the adhesive layer 4. Therefore, the adhesive that can be used for the adhesive layer 4 is not particularly limited. For example, an epoxy resin-based adhesive, a polyester resin-based adhesive, a urethane resin-based adhesive, an adhesive obtained by mixing these adhesives with rubber or elastomer, an adhesive to which conductivity is imparted, or the like can be used. Among the above-described ones, from the viewpoint of initial bonding strength, the adhesive layer 4 preferably contains the epoxy resin-based adhesive or the urethane resin-based adhesive (that is, thermosetting adhesive).

Additionally, it is preferable that the resin of the adhesive constituting the adhesive layer 4 has a common chemical structure with that of the resin in the film portion 22 or the resin in the film portion 32 or a combination thereof. Accordingly, the initial adhesion between the adhesive layer 4, and the film portion 22 and the film portion 32 can be made more excellent, and the bonding strength of the adhesively joined structure 1 can be further increased.

For example, the resin of the adhesive constituting the adhesive layer 4 may have a common main skeleton with that of the resin in the film portion 22 or the resin in the film portion 32 or a combination thereof. Alternatively, the resin of the adhesive constituting the adhesive layer 4 may have a common side chain functional group with that of the resin in the film portion 22 or the resin in the film portion 32 or a combination thereof.

The adhesively joined structure 1 according to the embodiment of the present invention has been described in detail above. According to the present embodiment, the resin particles 221 and the organic compound phase 223 in the film portion 22 and the film portion 32 suppress the entering of water into the interface between the first member 2 and the adhesive layer 4 and the entering of water into the interface between the second member 3 and the adhesive layer 4. As a result, the deterioration of the adhesive layer 4 and the corrosion of the first member 2 and the second member 3 are suppressed. For this reason, the decrease in bonding strength of the adhesively joined structure 1 is suppressed. That is, the adhesively joined structure 1 has excellent bonding durability.

Modification Example

The embodiment of the present invention has been described above. Hereinafter, some modification examples of the above embodiment of the present invention will be described. In addition, respective modification examples described below may be applied alone to the above embodiment of the present invention or may be applied in combination to the above embodiment of the present invention. Additionally, the respective modification examples may be applied instead of the configuration described in the above embodiment of the present invention or may be additionally applied to the configuration described in the above embodiment of the present invention. Hereinafter, the differences between the above-described embodiment and the respective modification examples will be mainly described, and the same matters will be appropriately omitted.

For example, in the above description, the second member 3 has been described to have the film portion 32. However, the present invention is not limited to this example. For example, the second member may not have the above-described film portion 32. FIG. 3 is a partially enlarged cross sectional view illustrating a bonding region of an adhesively joined structure according to a modification example of the present embodiment.

An adhesively joined structure 1A illustrated in FIG. 3 has a first member 2A and a second member 3A, and the first member 2A and the second member 3A are bonded to each other by an adhesive layer 4A. The first member 2A has a metal portion 21A, and a film portion 22A formed on the surface of the metal portion 21A. The film portion 22A has the resin particles 221 and the organic compound phase 223.

The second member 3A is a member bonded to the first member 2A via the adhesive layer 4A. And, unlike the above-described embodiment, the second member 3A does not have the film portion 32. In this case, the second member 3A can be constituted of any material.

For example, examples of the material that can be used for the second member 3A includes fiber reinforced plastics (FRPs) in which a resin material and a reinforcing fiber are contained in a matrix resin and made composite, ceramics materials, and the like in addition to the material of the above-described metal portion 21. Additionally, examples of the reinforcing fiber used in the fiber reinforced plastics include glass fiber, carbon fiber, and the like.

Even in the above case, since the adhesively joined structure 1A has the film portion 22A, the adhesively joined structure 1A has excellent bonding durability as compared to an adhesively joined structure that does not have the film portion 22A.

Figure 4:
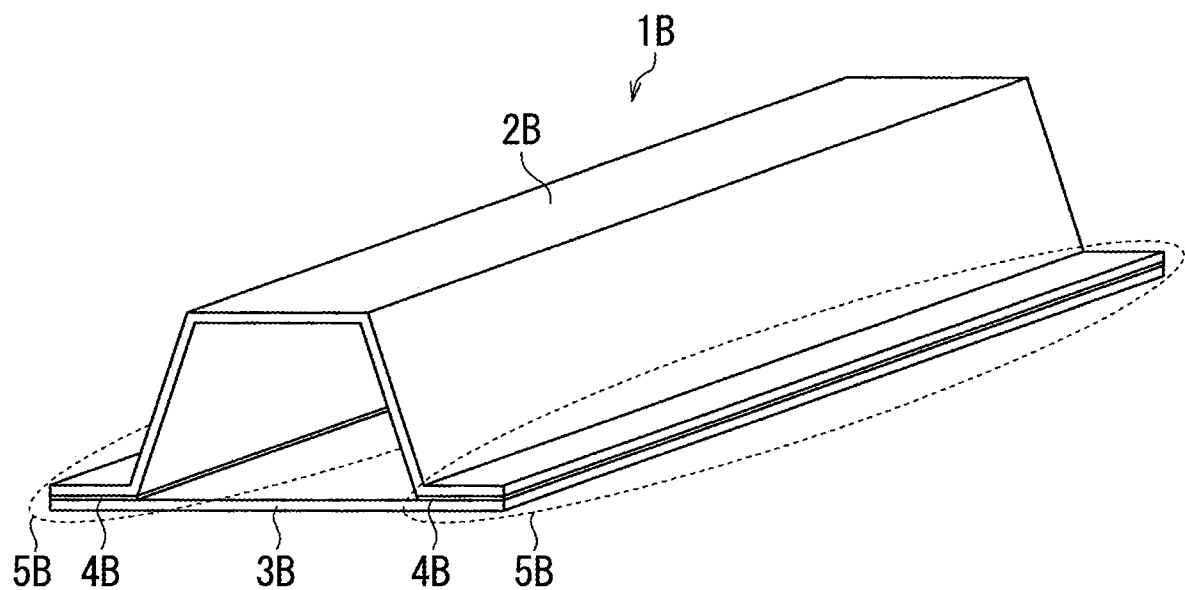
FIG. 4 is a schematic perspective view of an adhesively joined structure according to another modification example of the present invention.
Figure 5:
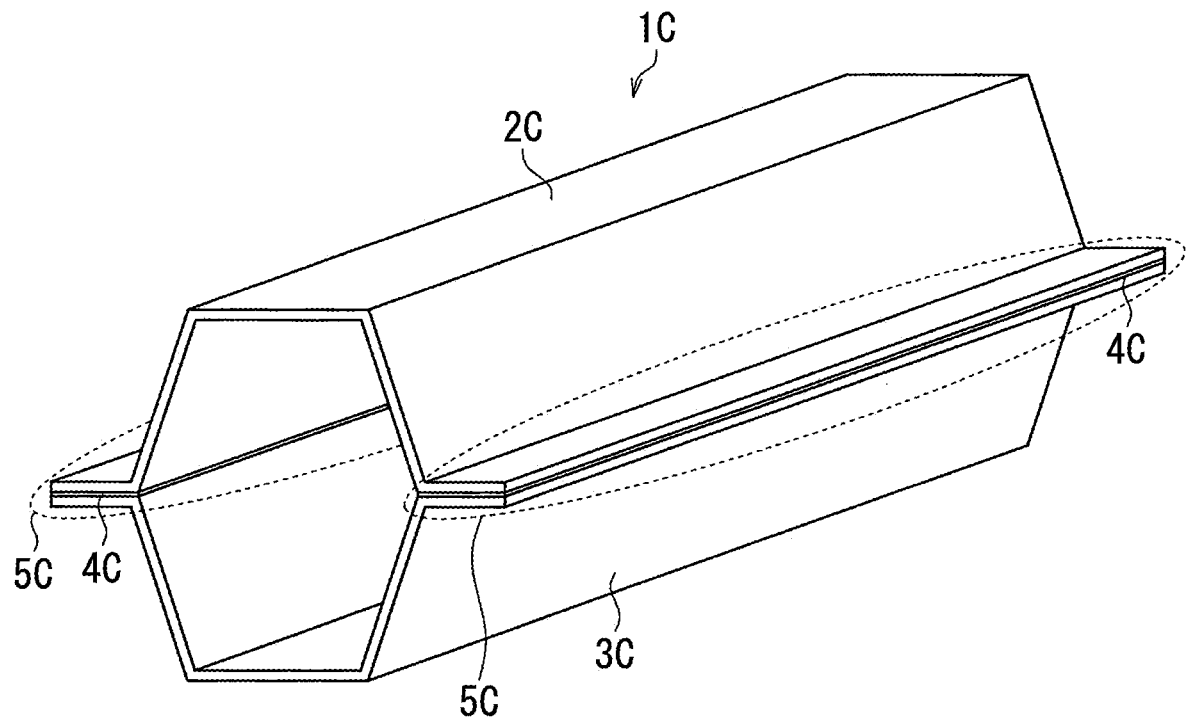
FIG. 5 is a schematic perspective view of an adhesively joined structure according to another modification example of the present invention.

Additionally, the shape of the adhesively joined structure according to the present embodiment is not limited to the above-described embodiment. The shapes of the first member and the second member constituting the adhesively joined structure according to the present embodiment can be any one, and any portion can also be selected as the bonding part between the first member and the second member. Moreover, the adhesively joined structure according to the present embodiment may have members other than the first member and the second member. FIGS. 4 and 5 are schematic perspective views of an adhesively joined structure according to another modification example of the present embodiment, and FIG. 6 is a schematic view illustrating a bonded state of the adhesively joined structure according to another modification example of the present embodiment.

An adhesively joined structure 1B illustrated in FIG. 4 has a hat-type first member 2B and a flat-plate-shaped second member 3B, and the second member 3B is bonded in a bonding region 5B on a flange portion of the first member 2B via the adhesive layer 4. An adhesively joined structure 1C illustrated in FIG. 5 has a hat-type first member 2C and a hat-type second member 3C, and these members are disposed such that flange portions thereof face each other. The facing flange portions of the first member 2C and the second member 3C are bonded to each other via an adhesive layer 4C to form a bonding region 5C. Moreover, in an adhesively joined structure 1D illustrated in FIG. 6, the second member 3D covers an end portion of a plate-shaped portion of the first member 2D by hem folding to form a hem portion. Also, in the hem portion, the first member 2D and the second member 3D are bonded to each other via an adhesive layer 4D.

Figure 6:
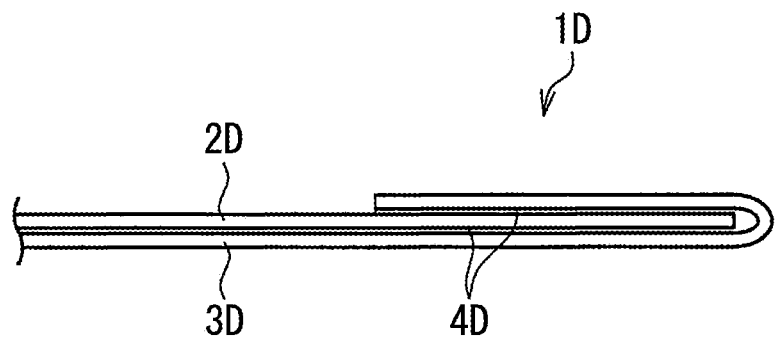
FIG. 6 is a schematic view illustrating a bonded state of an adhesively joined structure according to another modification example of the present invention.

In any of the modification examples illustrated in FIGS. 4 to 6, a film portion 22 containing the resin particles 221 and the organic compound phase 223 is formed on the surface of the first members 2B to 2D in contact with the adhesive layers 4B to 4D. Accordingly, the adhesively joined structure 1B to 1D are excellent in bonding durability.

In addition, in the above description, a case where the first members 2B to 2D have the metal portion 21 has been described. However, the second member 3B to 3D may have a metal portion 21 in addition to the above first member 2B and 2D. As long as the shape of the adhesively joined structure of the present invention is not limited, it is apparent that the bonding durability of the adhesively joined structure is excellent even in such a case.

Moreover, in the above-described embodiment, a case where the first member 2 and the second member 3 are bonded to each other only by the adhesive layer 4 has been described. However, the present invention is not limited to this, and adhesive joining by the adhesive layer can be combined with other joining methods (second joining).

The second joining that can be combined with the adhesive joining is not particularly limited, and any joining methods can be adopted. Specifically, examples of such joining methods include melt joining, non-melt joining, mechanical joining, and the like.

For example, spot welding, arc welding, laser welding, and the like can be used as the melt joining. The melt joining can be applied to a case where the first member and the second member have a metal portion. In addition, the melt joining may be performed by removing an adhesive layer. However, in a case where the adhesive layer has conductivity, the melt joining can be performed without removing the adhesive layer.

Examples of the non-melt joining include friction stir joining, diffusion joining, pressure welding, and the like. Examples of the mechanical joining include rivet joining and screw joining.

Application

Next, the applications of the adhesively joined structure according to the present invention will be described. The applications of the adhesively joined structure according to the present invention is not particularly limited, and the adhesively joined structure can be used as a member of any machine, building, structure, or the like. Particularly, the adhesively joined structure according to the present invention is excellent in water resistance and adhesiveness and is relatively lightweight because the adhesive is used. Therefore, the adhesively joined structure according to the present invention is easily placed in an environment in contact with water and is suitable for components for transportation equipment, particularly components for a vehicle, for which weight reduction is always required. Therefore, the present invention also relates to a component for a vehicle including the adhesively joined structure according to the present invention in one aspect thereof.

The component for a vehicle to which the adhesively joined structure according to the present invention is applied is not particularly limited and includes, for example, a closed cross sectional member bonded with a flange (for example, an A pillar, a B pillar, a side sill, and the like), members in which materials are partially stacked for the purpose of reinforcement, stiffening, and the like (for example, a B pillar reinforcement, an outer panel), panel members having a hem-processed portion (a door, a hood, and the like), and the like.

Manufacturing Method of Adhesively Joined Structure

Subsequently, a method of manufacturing the adhesively joined structure 1 according to the present embodiment will be briefly described.

The method of manufacturing the adhesively joined structure 1 according to the present embodiment includes a member forming step of forming each of the first member 2 and the second member 3 constituting the adhesively joined structure 1, and an adhesively joining step of joining the formed first member 2 and second member 3 to each other using a predetermined adhesive.

Member Forming Step

The member forming step includes a base material manufacturing step of manufacturing base materials of the first member 2 and the second member using the materials of the first member 2 and the second member 3; a film portion forming step of forming the film portion 22 by applying a film coating liquid for forming the film portion 22 to at least a part of the metal portion 21 of a base material serving as at least the first member 2 and then performing drying or baking; and a forming step of forming the base material of the first member 2 in which the film portion 22 is formed and a base material of the second member 3 in a desired shape as necessary.

Base Material Manufacturing Step

In the base material manufacturing step, the base materials of the first member 2 and second member 3 are manufactured using the materials of the first member 2 and the second member 3. The method of manufacturing the base materials is not particularly limited, and the base materials may be manufactured in accordance with usual methods by using various known manufacturing methods used to form desired base materials.

For example, in a case where the zinc-plated steel sheets are used as the first member 2 and the second member 3, hot-rolled steel sheets or cold-rolled steel sheets are manufactured in accordance with the usual methods, and zinc-plated layers may be formed on the hot rolled steel sheets or cold-rolled steel sheets in accordance with the usual methods. Additionally, even in a case where other metal materials, resin materials, FRP materials, ceramic materials, and the like are used as the base materials, various known manufacturing methods are used, and the other metal materials, resin materials, FRP materials, ceramics, and the like may be manufactured in accordance with the usual methods.

Film Portion Forming Step

In the film portion forming step, the film portion 22 is formed as the film coating liquid for forming the film portion 22 is applied to at least a part of the metal portion 21 of the base material serving as the first member 2, and then drying or baking is performed.

Here, the method of manufacturing the film coating liquid is not particularly limited. For example, a solvent such as water according to organic resins to be used may be used, and an organic resin containing one or more of the urethane group, the epoxy group, and the ester group and an organic silicon compound including the Si—C bond, the Si—O bond, or the Si—OH bond, or any combination thereof may be blended in a desired solid content volume percentage in such a solvent and may be mixed and stirred by known various methods.

The method of applying the film coating liquid for forming the film portion 22 is not particularly limited, and various known methods can be appropriately used. For example, in a case where the film coating liquid is a viscous liquid, the film coating liquid is applied by using known methods such as coating by a discharge method from a slit nozzle or a circular nozzle, brush coating, plate coating, spatula coating, and the like. Additionally, in a case where a film coating liquid in which the above components are dissolved in a predetermined solvent is used, for example, various known coating methods such as brush coating, spray coating, bar coater, discharge coating from nozzles of various shapes, die coater coating, curtain coater coating, roll coater coating, ink jet coating, and the like can be used. In addition to that, various known methods such as bar coater, roll coater, screen printing and powder coating can be adopted.

In the present embodiment, it is preferable to apply the film coating liquid after the manufacturing of the steel sheets or within 60 minutes after the plating is formed. When the time required to apply the film coating liquid is within 60 minutes, a chemical bond is easily formed between the organic silicon compound and the metal portion 21. Thus, when an analysis is made by TOF-SIMS, the count number of the peaks corresponding to the S—O-Me bonds (Me: metal element) is 15 or more. Additionally, when the time until the film coating liquid is applied is within 60 minutes, the value obtained by dividing the count value of the peaks indicating the S—O-Me bonds by the total value of all the secondary ion count numbers detected in a mass scanning range m/z=0 to 300 (total ion correction value) is $1.0 \times 10^{-3}$ or more.

Additionally, the drying or baking can be performed by, for example, heat treatment or the like. The heating conditions are not particularly limited, and for example, the drying or baking time can be 5 seconds or longer to 30 minutes or shorter under the temperature conditions of 80° C. or higher and 250° C. or lower.

Forming Step

In the forming step, the base material of the first member 2 in which the film portion 22 is formed, and the base material of the second member 3 is formed into a desired shape as necessary. Here, the forming method is not particularly limited and a processing method for obtaining the desired shape of a formed article may be selected from known metal processing methods. Additionally, as necessary, a part of the forming step and an adhesively joining step to be described below may be simultaneously performed.

Adhesively Joining Step

The adhesively joining step is a step of joining the formed first member 2 and the second member 3 with a predetermined adhesive. In the present step, first, a desired adhesive is disposed on the portions to be bonded (for example, the flange portions) in the obtained first member 2 and the second member 3 to form the bonding region 5. After that, the first member 2 and the second member 3 are stacked via the bonding region 5, and then the adhesive is cured by heat treatment. Here, the method of disposing the desired adhesive is not particularly limited, and a desired adhesive may be applied or a desired adhesive resin sheet may be disposed. Accordingly, it is possible to obtain the adhesively joined structure 1 according to the present embodiment, in which the first member 2 and the second member 3 are adhesively joined to each other via the adhesive layer 4.

In addition, in the above adhesively joining step, various coating treatments and other joining treatments may be performed, as necessary. For example, as the joining treatment, mechanical joining using bolting or riveting, welding processing such as spot welding, or the like may be performed.

More specifically, for example, in a case where the adhesively joined structure 1D illustrated in FIG. 6 is manufactured, the adhesively joined structure 1E can be obtained by applying an adhesive to one side or both sides of a flange portion that joins the formed first member 2 and the second member 3 and stacking the joined portions of the first member 2 and the second member 3 via the adhesive, and curing the adhesive by holding at room temperature or heat treatment of the adhesive.

Additionally, for example, in a case where the first member 2 serving as the metal member is reinforced by the second member 3 serving as a fiber reinforced plastic as in the adhesively joined structure 1 illustrated in FIG. 1, the adhesively joined structure 1 can be obtained by performing warm-forming in a state in which the first member 2 and the second member 3 are stacked via the adhesive.

The method of manufacturing the adhesively joined structure 1 according to the present embodiment has been briefly described above. In addition, the adhesively joined structure according to the present invention is not limited to one manufactured by the above-described manufacturing method and can be manufactured by any manufacturing method.

EXAMPLES

Hereinafter, the present invention will be described in more detail with reference to Examples. In addition, the examples to be described below are merely examples of the present invention, and the present invention is not limited thereto.

Manufacturing of Adhesively Joined Structure

Metal Portion

Ten types of metal members shown below were prepared as the metal portions of the adhesively joined structures.
(a) Galvannealed steel sheet (GA270) having a thickness of 1.0 mm and a tensile strength of 270 MPa.
(b) Galvannealed steel sheet (GA590) having a thickness of 1.0 mm and a tensile strength of 590 MPa.
(c) Galvannealed steel sheet (GA980) having a thickness of 1.0 mm and a tensile strength of 980 MPa.
(d) Galvannealed steel sheet (GA1300) having a thickness of 1.0 mm and a tensile strength of 1300 MPa.
(e) Cold-rolled steel sheet (CR270) having a thickness of 1.0 mm and a tensile strength of 270 MPa.
(f) Cold-rolled steel sheet (CR590) having a thickness of 1.0 mm and a tensile strength of 590 MPa.
(g) Cold-rolled steel sheet (CR980) having a thickness of 1.0 mm and a tensile strength of 980 MPa.
(h) Cold-rolled steel sheet (CR1300) having a thickness of 1.0 mm and a tensile strength of 1300 MPa.
(i) Galvanized steel sheet (GI980) having a thickness of 1.0 mm and a tensile strength of 980 MPa.
(j) Standard A5052 aluminum sheet (Al) having a thickness of 1.0 mm and a tensile strength of 290 MPa.

Here, the methods of manufacturing the steel sheets and plated steel sheets of the above (a) to (i) will be described below.

Steels having component compositions illustrated in Table 1 below were hot-rolled, pickled, and cold-rolled in accordance with usual methods to obtain cold-rolled steel sheets having a thickness of 1.0 mm. Next, with respect to the metal members (e), (f), (g), and (h), the produced cold-rolled steel sheets were heated at the average temperature increase velocity of 3.5° C./seconds in a heating furnace up to 820° C. that is the maximum attainment temperature and then soaked in a soaking furnace for a certain period of time at 820° C. to perform annealing to obtain samples. The atmosphere in the heating furnace and the soaking furnace was a nitrogen gas atmosphere containing 3% hydrogen.

Next, with respect to the metal member (i), the produced cold-rolled steel sheet was heated at the average temperature increase velocity of 3.5° C./seconds in the heating furnace up to 820° C. that is a maximum attainment temperature and then soaked in the soaking furnace for a certain period of time at 820° C. to perform annealing and cooled up to 450° C. Then, the steel sheets were immersed in a melting plating bath in which a component of Zn-0.2% Al is melted and plated, and nitrogen gas is blown from a slit nozzle while the steel sheets are pulled out from the plating bath to perform the gas wiping to adjust the adhesion amount. The adhesion amount was adjusted so as to be 60 g/m² on one side. The atmosphere in the heating furnace and the soaking furnace was a nitrogen gas atmosphere containing 3% hydrogen.

Next, with respect to the metal members (a), (b), (c), and (d), the produced cold-rolled steel sheets were heated at the average temperature increase velocity of 3.5° C./seconds in the heating furnace up to 820° C. that is a maximum attainment temperature and then soaked in the soaking furnace for a certain period of time at 820° C. to perform annealing and cooled down to 450° C. Then, the steel sheets were immersed in a melting plating bath in which a component of Zn-0.1% Al is melted and plated, and nitrogen gas is blown from a slit nozzle while the steel sheets are pulled out from the plating bath to perform the gas wiping to adjust the adhesion amount. Moreover, by performing heating to 480° C. in the alloying furnace, a plated layer was alloyed and Fe was diffused during plating. The adhesion amount was adjusted so as to be 45 g/m² on one side. The atmosphere in the heating furnace and the soaking furnace was a nitrogen gas atmosphere containing 3% hydrogen.

Additionally, a commercially available A5052 aluminum sheet was used as the metal member (j).

TABLE 1

| Metal Type | component Composition [% by mass] (Remainder is Fe and Impurities) | | | | | | | | Tensile Strength [MPa] |
|---|---|---|---|---|---|---|---|---|---|
| | C | Si | Mn | P | S | Al | N | Other components | |
| (a), (e) | 0.002 | 0.01 | 0.13 | 0.013 | 0.0100 | 0.026 | 0.0028 | Ti:0.057, Cr:0.04, Ni:0.02 | 270 |
| (b), (f) | 0.174 | 1.47 | 0.42 | 0.008 | 0.0025 | 0.043 | 0.0011 | | 590 |
| (c), (g), (i) | 0.131 | 1.19 | 1.92 | 0.009 | 0.0025 | 0.027 | 0.0032 | | 980 |
| (d), (h) | 0.269 | 2.07 | 2.26 | 0.007 | 0.0052 | 0.013 | 0.0023 | Ni:0.36, Cu:0.16, Ca:0.0022 | 1300 |

Film Coating Liquid

The following eight types of film coating liquids were prepared for forming the film portions.
- (A1) Water-dispersed emulsion type polyurethane resin SF-150 made by DAIICHI KOGYO CO., LTD. and 3-glycidoxypropyltriethoxysilane were blended in a solid content mass ratio of 3:2 to form a film coating liquid A1.
- (A2) Water-dispersed emulsion type polyurethane resin SF-150 made by DAIICHI KOGYO CO., LTD. and 3-glycidoxypropyltriethoxysilane were blended in a solid content mass ratio of 5:1 to form a film coating liquid A2.
- (A3) Water-dispersed emulsion type polyurethane resin SF-150 made by DAIICHI KOGYO CO., LTD. and 3-glycidoxypropyltriethoxysilane were blended in a solid content mass ratio of 1:5 to form a film coating liquid A3.
- (A4) Water-dispersed emulsion type polyurethane resin SF-150 made by DAIICHI KOGYO CO., LTD. and 3-glycidoxypropyltriethoxysilane were blended in a solid content mass ratio of 7:3 to form a film coating liquid A4.
- (A5) Water-dispersed emulsion type polyurethane resin SF-150 made by DAIICHI KOGYO CO., LTD. and 3-glycidoxypropyltriethoxysilane were blended in a solid content mass ratio of 3:7 to form a film coating liquid A5.
- (B) Water-dispersed emulsion type epoxy resin EM-0461N made by ADEKA CORPORATION and 3-glycidoxypropyltriethoxysilane were blended in a solid content mass ratio of 3:2 to form a film coating liquid B.
- (C) Water-dispersed emulsion type polyester resin MD-1100 made by TOYOBO CO., LTD. and 3-glycidoxypropyltriethoxysilane were blended in a solid content mass ratio of 3:2 to form a film coating liquid C.
- (D) A film coating liquid D having only the water-dispersed emulsion type polyurethane resin SF-150 made by DAIICHI KOGYO CO., LTD as an aqueous solution was prepared.
- (E) A film coating liquid E having only 3-glycidoxypropyltriethoxysilane as an aqueous solution was prepared.
- (F) A resin solution was adjusted in which Polyester resin Byron GK140 made by TOYOBO CO., LTD. was dissolved in cyclohexanone in a solvent, imino-based melamine cymel 325 made by NIPPON CYTEC INDUSTRIES CO., LTD. was mixed with the resin such that the solid content mass ratio is 5:1, and a curing catalyst (Catalyst 296-9: NIPPON CYTEC INDUSTRIES CO., LTD.) was added to on the resin solid content in an amount of 0.1% by mass. Moreover, 3-glycidoxypropyltriethoxysilane was blended with the resin solution in a solid content mass ratio of 3:2 to obtain a film coating liquid F.
- (G1) Water-dispersed emulsion type polyurethane resin SF-150 made by DAIICHI KOGYO CO., LTD., 3-glycidoxypropyltriethoxysilane, and colloidal silica were blended in a solid content mass ratio of 3:1:1 to form a film coating liquid G1.
- (G2) Water-dispersed emulsion type polyurethane resin SF-150 made by DAIICHI KOGYO CO., LTD., 3-glycidoxypropyltriethoxysilane, and colloidal silica were blended in a solid content mass ratio of 11:8:1 to form a film coating liquid G2.

Production of First Member

Within 60 minutes after the above metal members were produced, the produced film coating liquids were applied onto the above-described metal members with the bar coater under the conditions of the respective average thicknesses shown in the following Table 2. Only in Example 1, after 240 hours had passed after the metal member was produced (after a plated layer was alloyed), a film coating liquid was applied so as to have the average thickness shown in Table 2. Then, in an induction heating furnace, a first member having a film portion formed was produced by drying and baking at the maximum attainment sheet temperature (PMT 150° C.). The average thickness of a film was determined by observing the cross section of the first member using TEM or SEM, measuring the thicknesses of the film at five points where the cross section is divided into five equal parts in the width direction, and calculating the average value. Additionally, the film was held in the state of a coating film for 5 seconds from the time of the application to the start of the drying. The coating film retention time was adjusted by controlling the transport speed of a steel sheet from the application to a heating furnace. The coating film was dried at the maximum attainment sheet temperature (PMT) of 150° C. using the induction heating furnace. In addition, in Comparative Example 1, no film portion was formed.

Manufacturing of Adhesively Joined Structure

Tensile Shear Test Piece

Tensile shear test pieces were produced on the basis of JIS K6850 using two prepared first members. Penguins Cement #1066, an epoxy resin-based adhesive made by SUNSTAR INC. was prepared by adding 5% by mass of 200 μm glass beads. Such an epoxy resin-based adhesive was applied to end portions of the first members such that the bonding area of length 12.5 mm×width 25 mm was obtained, the end portions of the first members to which the adhesive was applied were pasted together, and the adhesive was cured by being left in an atmosphere of 170° C. for 30 minutes to produce a tensile shear test piece.

Flange Member

By forming the prepared first member, a metallic hat-type member having a flange was produced. Penguins Cement #1066, an epoxy resin-based adhesive made by SUNSTAR INC. was prepared by adding 5% by mass of 200 μm glass beads. Next, the epoxy resin-based adhesive was applied to a flange portion of the produced formed body, another first member is pasted thereto, and the formed body was left in an atmosphere of 170° C. for 30 minutes to cure the adhesive to create a closed cross-sectional structure.

In addition, in Example 19, a structure of a joining member was also produced by using the spot welding on the flange portion applied with the adhesive in combination. Specifically, spot welding was performed using a CF type Cr—Cu electrode of R40 having a tip diameter of 5 mm and at dotting intervals of 30 mm pitch under welding conditions where the nugget diameter was 3×t0.5 (t is sheet thickness [mm]). In addition, no adhesive was applied to a predetermined spot-welded portion to be spot-welded.

Additionally, in Example 20, 5% by mass of 200 μm glass beads were added to UM700, a urethane resin-based adhesive made by CEMEDINE CO., LTD., and the beads were left at room temperature for 24 hours and cured to produce a flat cross section structure. Additionally, in Example 21, 5% by mass of 200 μm glass beads were added to Hard Rock M-600-08, an acrylic resin-based adhesive made by DENKI KAGAKU KOGYO CO., LTD. and left at room temperature for 24 hours and cured to produce a closed cross-sectional structure.

Evaluation Test Method

Cross Section Analysis of Film Portion

The IR analysis, the TEM observation, and the TOF-SIMS analysis were performed on a vertical cross section in the vicinity of an interface between a metal portion and an adhesive layer in an obtained adhesively joined structure according to the method described earlier.

A film portion of the vertical cross section in the vicinity of the interface between the metal portion and the adhesive layer in the obtained adhesively joined structure was cut at an inclination of 5 degrees with the oblique cutting device (SAICAS, DN-20S type made by DAIPLA WINTES CO., LTD.) to enlarge the film portion. As a micro-IR (infrared spectroscopy) analysis in the film portion, mapping measurement was performed using IRT-5200 made by JASCO CORPORATION, and whether or not one or more of the water-based polyurethane resin, the epoxy resin, and the polyester resin were contained and whether or not one or more of the Si—C bond, the Si—O bond, and the Si—OH bond were contained were determined from the attribution of an observation peak derived from a resin component in the infrared absorption spectrum of the obtained film. Specifically, in the obtained infrared absorption spectrum, the epoxy group is determined to be contained in a case where a peak was observed in the vicinity of 910 cm$^{-1}$, the urethane group was determined to be contained in a case where a peak is observed in the vicinity of 1550 cm$^{-1}$ and in the vicinity of 1740 cm$^{-1}$, and the ester group was determined to be contained in a case where a peak is observed in the vicinity of 1720 to 1740 cm$^{-1}$. A case where the epoxy group, the urethane group, and the ester group were determined to be contained was defined as A, and a case where these functional groups were determined not be contained was defined as B.

Additionally, a case where a peak of 1250 to 1260 cm$^{-1}$ (derived from Si—C bond) was observed and a peak of 1000 to 1100 cm$^{-1}$ (derived from Si—O bond), or a peak of 3650 to 3690 cm$^{-1}$ (derived from Si—OH bond) was observed was determined to contain the Si—C bond, the Si—O bond, or Si—OH bond, or any combination thereof. A case where the Si—C bond, the Si—O bond, or the Si—OH bond, or any combination thereof were determined to be contained was defined as A, and a case where these bonds were determined not to be contained was defined as B.

The vertical cross section in the vicinity of the interface between the metal portion and the adhesive layer was subjected to Os-staining and then cut out by a cryo and room temperature FIB-microsampling method to produce a thin film sample for the TEM observation. Next, FE-TEM (NB5000 made by HITACHI HIGH-TECHNOLOGIES CORPORATION) was used to observe five points where the adhesive layer was divided into five equal parts in the width direction. At the respective observation points, the EDS analysis (element mapping) was performed in the vicinity of the interface between the metal portion and the adhesive layer under the conditions of a probe diameter of about 2 nm and an acceleration voltage of 200 kV to obtain respective element maps of C, O, and Si. Then, C and other elements in the film portions of the obtained element maps were are binarized, and the average particle sizes and the area percentages of the resin particles in the film portions were calculated. These results were evaluated as follows.

A case where the structure was such that the resin particles containing one or more the urethane group, the epoxy group, and the ester group were dispersed in the organic compound phase, the average particle size of the resin particles is 20 nm or more to less than 200 nm, and the resin particles occupy 20% to 80% of the cross sectional area of the film was evaluated as a dispersed state A, and a case where the structure was not as described above was evaluated as a dispersed state B.

TOF-SIMS Analysis of Bonding Interface

By cutting an adhesively joined portion from the adhesive layer side toward the metal portion side at an inclination of 5 degrees with the oblique cutting device (SAICAS, DN-20S type made by DAIPLA WINTES CO., LTD.) and by using the Ar spattering in combination, a sample in which the thickness of an adhesive layer is reduced to about 1 μm was produced. Any one point of the portion where the thickness of the adhesive layer was reduced to about 1 μm was analyzed by TOF-SIMS from the adhesive layer side toward the metal portion side while performing the Ar spattering. An analytical instrument used was TOF-SIMS TRIFT-V made by ULVAC-PHI, INC. TOF-SIMS measurement was repeated after the spattering from the surface to a certain depth with an Ar beam, and then similarly TOF-SIMS measurement was repeated after the spattering, and the distribution in the depth direction was acquired for various elements and bonds. The primary ion species is $Au_3^+$, the acceleration voltage is 30 kV, the spattering rate is about 80 nm/min ($SiO_2$ conversion), and the measurement region is 50 μm×50 μm. A case where peaks indicating S—O-Me bonds were present at the interface portion between the film portion (adhesive layer in a case where no film portion was provided) and the metal portion and a value obtained by dividing a count value of the peaks indicating such S—O-Me bonds by a total value of all secondary ion count numbers detected in a mass scanning range m/z=0 to 300 (total ion correction value) was $1.0 \times 10^{-3}$ or more were evaluated as A. A case where the peaks indicating the count value as described above were not present was evaluated as B.

In addition, in the present example, cold-rolled steel sheets, two types of zinc-plated steel sheets, and aluminum sheets are used as the metal members. Therefore, three bonds of the Si—O—Fe bond, the Si—O—Zn bond, and the Si—O—Al bond can be generated as the S—O-Me bond. Here, the typical peak positions in TOF-SIMS corresponding to the above three bonds are as mentioned above.

Additionally, in a case where the zinc-plated steel sheet (GA/GI) is used, two bonds of the Si—O—Fe bond and the Si—O—Zn bond can be generated. In this case, a case where the total ion correction value of the peaks corresponding to the Si—O—Fe bonds or the peaks corresponding to the Si—O—Zn bond or a combination thereof was $1.0 \times 10^{-3}$ or more was evaluated as A.

Initial Fracture Stress

With respect to each of the obtained tensile shear test pieces, the test piece was pulled at a tension rate of 5 mm/min on the basis of JIS K6850: 1999, and the fracture stress (MPa) was determined. A case where the initial fracture stress was less than 20 MPa was evaluated as D, a case where the initial fracture stress was 20 MPa or more to less than 25 MPa was evaluated as C, a case where the initial fracture stress was 25 MPa or more to less than 30 MPa was evaluated as B, and a case where the initial fracture stress was 30 MPa or more was evaluated as A. The results obtained are illustrated in the "Initial strength" column of Table 2.

Joining Durability Evaluation

The joining durability of each of the obtained adhesively joined structures according to the respective examples was evaluated.

First, the torsional rigidity of the adhesively joined structure according to each example was measured and calculated by a torsion tester. Specifically, both end portions of the adhesively joined structure according to each example were fixed with a jig, and only one end portion was rotated with a central axis of the joined structure as a rotational axis to add torsional distortion to the adhesively joined structure. In this case, the torsional angle and the torsional moment were measured, and the torsional rigidity of each adhesively joined structure was calculated from a relationship between the torsional angle and the torsional moment in an elastic distortion range. As the relationship between the torsional angle and the torsional moment in the elastic distortion range, specifically, the initial inclination of a torsional angle-torsional moment diagram was used.

Next, the adhesively joined structure according to each example was allowed to stand in a constant temperature and humidity bath having a wet environment of 80° C. and a relative humidity of 95% for 500 hours to promote deterioration of the adhesive layer and the adhesive layer/film portion interface. The torsional rigidity of the adhesively joined structure according to each example after the standing in the constant temperature and humidity bath was measured and calculated by the torsion tester. Then, the rate of decrease in the torsional rigidity due to the deterioration was calculated in comparison with the torsional rigidity of the adhesively joined structure according to each example for which no deterioration test was performed, and the obtained rate of decrease was used as an evaluation index of the joining durability.

A case where the rate of decrease in bending strength after being left in the high-temperature and high-humidity atmosphere with respect to the bending strength before being left in a high-temperature and high-humidity atmosphere was less than 10% is evaluated as A, a case where the rate of decrease was 10% or more to less than 30% was evaluated as B, a case where the rate of decrease was 30% or more to less than 50% was evaluated as C, and a case where the rate of decrease was 50% or more was evaluated as D. C or higher was evaluated as the passes. The obtained results are shown in the column of "Torsional rigidity" in Table 2.

The obtained results are collectively shown in the following Table 2. In addition, the underline portions in Table 2 indicate out of the scope of the present invention. "-" in spot welding indicates that no spot welding has been performed.

TABLE 2

| No | | Metal Portion | | Film Portion | | | | | | | | Evaluation | | | | |
|---|---|---|---|---|---|---|---|---|---|---|---|---|---|---|---|---|
| | | Type | Strength [MPa] | Film Coating Liquid | Urethane Group Epoxy Group Ester Group | Si—O Bond Si—C Bond Si—OH Bond | Volume Percentage of Organic Compound Phase (vol %) | Volume Percentage of Inorganic Compound Phase (vol %) | Average Thickness [μm] | Adhesive Layer | Spot Welding | Dispersed State | Si—O—Me Bond | Initial Strength | Torsional Rigidity |
| Comparative Example | 1 | GA | 980 | None | B | B | 0.0 | 0.0 | 0 | Epoxy | — | B | B | A | D |
| Comparative Example | 2 | GA | 980 | D | A | B | 0.0 | 0.0 | 1 | Epoxy | — | B | B | A | D |
| Comparative Example | 3 | GA | 980 | E | A | A | 100.0 | 0.0 | 1 | Epoxy | — | B | A | A | D |
| Comparative Example | 4 | GA | 980 | G1 | A | A | 20.0 | 20.0 | 1 | Epoxy | — | B | B | B | D |
| Example | 1 | GA | 980 | A1 | A | A | 40.0 | 0.0 | 1 | Epoxy | — | A | B | A | C |
| Example | 2 | GA | 980 | A1 | A | A | 40.0 | 0.0 | 0.1 | Epoxy | — | A | A | A | C |
| Example | 3 | GA | 980 | A1 | A | A | 40.0 | 0.0 | 1 | Epoxy | — | A | A | A | B |
| Example | 4 | GA | 980 | A1 | A | A | 40.0 | 0.0 | 2 | Epoxy | — | A | A | A | B |
| Example | 5 | GA | 980 | A1 | A | A | 40.0 | 0.0 | 100 | Epoxy | — | A | A | A | C |
| Example | 6 | GA | 980 | A2 | A | A | 16.7 | 0.0 | 1 | Epoxy | — | B | A | A | C |
| Example | 7 | GA | 980 | A3 | A | A | 83.3 | 0.0 | 1 | Epoxy | — | B | A | A | B |
| Example | 8 | GA | 980 | B | A | A | 40.0 | 0.0 | 1 | Epoxy | — | A | A | A | B |
| Example | 9 | GA | 980 | C | A | A | 40.0 | 0.0 | 1 | Epoxy | — | A | A | A | B |
| Example | 10 | GA | 270 | A1 | A | A | 40.0 | 0.0 | 1 | Epoxy | — | A | A | D | B |
| Example | 11 | GA | 590 | A1 | A | A | 40.0 | 0.0 | 1 | Epoxy | — | A | A | B | B |
| Example | 12 | GA | 1300 | A1 | A | A | 40.0 | 0.0 | 1 | Epoxy | — | A | A | A | B |
| Example | 13 | CR | 270 | A1 | A | A | 40.0 | 0.0 | 1 | Epoxy | — | A | A | C | B |
| Example | 14 | CR | 590 | A1 | A | A | 40.0 | 0.0 | 1 | Epoxy | — | A | A | B | B |
| Example | 15 | CR | 980 | A1 | A | A | 40.0 | 0.0 | 1 | Epoxy | — | A | A | A | B |
| Example | 16 | CR | 1300 | A1 | A | A | 40.0 | 0.0 | 1 | Epoxy | — | A | A | A | B |
| Example | 17 | GI | 980 | A1 | A | A | 40.0 | 0.0 | 1 | Epoxy | — | A | A | A | C |
| Example | 18 | Al | 290 | A1 | A | A | 40.0 | 0.0 | 1 | Epoxy | — | A | A | C | C |
| Example | 19 | GA | 980 | A1 | A | A | 40.0 | 0.0 | 1 | Epoxy | Yes | A | A | A | A |
| Example | 20 | GA | 980 | A1 | A | A | 40.0 | 0.0 | 1 | Urethane acrylic | — | A | A | D | B |
| Example | 21 | GA | 980 | A1 | A | A | 40.0 | 0.0 | 1 | Epoxy | — | A | A | D | C |
| Example | 22 | GA | 980 | A4 | A | A | 30.0 | 0.0 | 1 | Epoxy | — | A | A | A | B |
| Example | 23 | GA | 980 | A5 | A | A | 70.0 | 0.0 | 1 | Epoxy | — | A | A | A | B |
| Example | 24 | GA | 980 | F | A | A | 40.0 | 0.0 | 1 | Epoxy | — | B | A | A | C |
| Example | 25 | GA | 980 | G2 | A | A | 40.0 | 5.0 | 1 | Epoxy | — | A | A | A | B |

As illustrated in Table 2, in the adhesively joined structures according to Examples 1 to 21, the decrease in torsional rigidity was significantly suppressed as compared to the adhesively joined structures according to Comparative Examples 1 to 3, and the bonding durability was excellent.

The adhesively joined structure of Comparative Example 1 has the same performance as that of the above-described Example with respect to the initial fracture stress. However, since no film portion was formed, the entering of water could not suppressed, and the effect of improving the bonding durability was not obtained. Since the joined structure of Comparative Example 2 did not contain the Si—C bond, the Si—O bond, or the Si—OH bond, or any combination thereof and did not have the Si—O-Me bond, the adhesion with the metal portion was not obtained, and the effect of improving the bonding durability was not obtained. Since the adhesively joined structure of Comparative Example 3 did not have the organic resin phase containing any of the urethane group, the epoxy group, and the ester group, the adhesion between the film portion and the adhesive layer was not obtained, and the effect of improving the bonding durability was not obtained. In the adhesively joined structure of Comparative Example 4, since the volume percentage of the inorganic compound phase exceeds 10%, the effect of improving the bonding durability could not be obtained.

Here, comparing Example 1 with Example 3, the effect of improving the bonding durability in the adhesively joined structure of Example 3 in which the time from the alloying of the plated layer to the application of the film coating liquid was shorter could be further obtained compared to that in the adhesively joined structure of Example 1 in which the time from the alloying of the plated layer to the application of the film coating liquid was long. It is considered that this is because the adhesively joined structure of Example 3 capable of forming more S—O-Me bonds could further suppress the entering of moisture into a gap between the metal portion and the film portion than the adhesively joined structure of Example 1, and consequently, the adhesion the metal portion and the film portion was improved.

Comparing Examples 2 to 5 with each other, the average thickness of the film portion was in the range of 0.2 μm to 1.5 μm. However, the effect of improving the bonding durability could be obtained most. On the other hand, it has been found that in a case where the average thickness of the film portion is too large or too small, it is difficult to obtain the effect of bonding durability. Moreover, in a case where the average thickness is too thick, there is a possibility that the spot welding cannot be used in combination.

Comparing Example 3 and Examples 6 to 9 with each other, in a case where the structure of the film portion is a structure in which the resin particles containing one or more of the urethane group, the epoxy group, and the ester group are dispersed in the organic compound phase formed of the organic silicon compound containing the Si—C bond, the Si—O bond, or the Si—OH bond, or any combination thereof, the average particle size of the resin particles is 20 nm or more to less than 200 nm, and the resin particles occupies 20% or more to less than 80% of the cross sectional area of the film portion, the effect of improving the bonding durability could be obtained. It is considered that in a case where such a structure was provided, both the adhesion between the metal portion and the film portion and the adhesion between the film portion and the adhesive layer could be compatible with each other.

In Examples 10 to 18, the bonding durability was improved by forming the film portion regardless of the type of the metal portion. When a tensile shear test was performed on a low-strength steel sheet, stress concentration accompanied by the distortion of the sheet occurred. Therefore, the initial fracture stress tended to be lower than that of a high strength steel sheet. Additionally, particularly in GA270 of Example 8, the fracture stress was lower than that of CR of the same strength (Example 11) due to the plating exfoliation caused by the stress concentration. However, it was clarified that the distortion of the sheet was suppressed as the strength increases and thereby the plating exfoliation was suppressed, and the fracture stress equivalent to that of the cold-rolled steel sheet of the same strength was generated.

Comparing Example 3 with Example 19, when the spot welding was used in combination, the effect of further improving the bonding durability was obtained.

Comparing Example 3, Example 20, and Example 21 with each other, in a case where the adhesive layer was the epoxy resin-based or urethane resin-based adhesive, excellent bonding durability was exhibited. This is because the resin component contained in the film portion has excellent adhesion with the epoxy resin and urethane resin.

Comparing Example 6, Example 7, Example 22, and Example 23 with each other, it was found that when the area percentage of the organic resin phase was 20 to 80%, more excellent bonding durability was exhibited.

From the comparison between Examples 9 and 24, it was found that, in a case where the resin particles were used as the organic resin phase, the bonding durability was further improved.

From the comparison of Example 3 and Example 25, it was shown that the addition of a small amount of colloidal silica did not affect the bonding durability.

Although the preferred embodiment of the present invention have been described above in detail with reference to the accompanying drawings, the present invention is not limited to such an example. It is apparent that those having ordinary knowledge in the technical field to which the present invention belongs can conceive various changes or alternations within the scope of the technical ideas described in the claims, and it is naturally understood that these also belong to the technical scope of the present invention.

BRIEF DESCRIPTION OF THE REFERENCE SYMBOLS 1, 1A, 1B, 1C, 1D adhesively joined structure
2, 2A, 2B, 2C, 2D first member
21, 21A metal portion
22, 22A film portion
221 resin particles
223 organic compound phase
3, 3A, 3B, 3C, 3D second member
31 metal portion
32 film portion
321 resin particles
323 organic compound phase
4, 4A, 4B, 4C, 4D adhesive layer
5, 5B, 5C bonding region

What is claimed is:
1. An adhesively joined structure comprising:
a first member having a first metal portion and a film portion disposed on at least a part of a surface of the first metal portion;
a second member;
an adhesive layer for joining the first member and the second member to each other via the film portion, wherein the film portion includes an organic resin phase containing one or more of a urethane group, an epoxy group, and an ester group;

an organic compound phase formed of an organic silicon compound; and optionally an inorganic compound phase formed of an inorganic silicon compound, a total volume percentage of the organic compound phase and the inorganic compound phase to a total volume of the film portion is 16 vol % to 84 vol %, a volume percentage of the organic compound phase to the total volume of the film portion is 16 vol % to 84 vol %, a volume percentage of the inorganic compound phase to the total volume of the film portion is limited to 10 vol % or less, the organic silicon compound includes a Si—C bond; and a Si—O bond or a Si—OH bond or combination thereof, wherein the second member is constituted of a second metal portion, fiber reinforced plastics, or ceramics materials.

2. The adhesively joined structure according to claim 1, wherein the total volume percentage of the organic compound phase and the inorganic compound phase is 20 vol % to 80 vol %.

3. The adhesively joined structure according to claim 2, wherein the organic resin phase is resin particles containing one or more of the urethane group, the epoxy group, and the ester group, an average particle size of the resin particles is 20 nm or more to less than 200 nm, and an area percentage of the resin particles is 20% to 80% with respect to a cross sectional area of the film portion in a cross section taken in a thickness direction of the film portion.

4. An adhesively joined structure according to claim 1, wherein when the film portion is analyzed by a time-of-flight secondary ion mass spectrometry while the film portion is Ar-spattered from the adhesive layer side toward the first metal portion side to include an optional point of an interface between the first metal portion and the film portion, peaks corresponding to Si—O-Me bonds, which are bonds with a metal element Me constituting the first metal portion, were observed, and a value obtained by dividing a count value of the peaks indicating the Si—O-Me bonds by a total value of all the secondary ion count numbers detected in a mass scanning range m/z=0 to 300 is $1.0 \times 10^{-3}$ or more.

5. The adhesively joined structure according to claim 1, wherein an average thickness of the film portion is 0.2 μm to 1.5 μm per one side of the first member.

6. The adhesively joined structure according to claim 1, wherein a resin of an adhesive constituting the adhesive layer has a common chemical structure with a resin constituting the organic resin phase in the film portion.

7. The adhesively joined structure according to claim 1, wherein the adhesive layer contains an epoxy resin-based adhesive or a urethane resin-based adhesive or combination thereof.

8. The adhesively joined structure according to claim 1, wherein the first metal portion is a steel.

9. The adhesively joined structure according to claim 1, wherein the first metal portion is a zinc-plated steel sheet.

10. The adhesively joined structure according to claim 1, wherein the first metal portion is a galvannealed steel sheet having a tensile strength of 590 MPa or more.

11. The adhesively joined structure according to claim 1, wherein the first metal portion is a galvannealed steel sheet having a tensile strength of 980 MPa or more.

12. The adhesively joined structure according to claim 1, wherein the first member and the second member are further joined by a second joining.

13. The adhesively joined structure according to claim 12, wherein the second joining is spot welding.

14. A component for a vehicle comprising:

the adhesively joined structure according to claim 1.

15. An adhesively joined structure according to claim 2, wherein when the film portion is analyzed by a time-of-flight secondary ion mass spectrometry while the film portion is Ar-spattered from the adhesive layer side toward the first metal portion side to include an optional point of an interface between the first metal portion and the film portion, peaks corresponding to Si—O-Me bonds, which are bonds with a metal element Me constituting the first metal portion, were observed, and a value obtained by dividing a count value of the peaks indicating the Si—O-Me bonds by a total value of all the secondary ion count numbers detected in a mass scanning range m/z=0 to 300 is $1.0 \times 10^{-3}$ or more.

16. An adhesively joined structure according to claim 3, wherein when the film portion is analyzed by a time-of-flight secondary ion mass spectrometry while the film portion is Ar-spattered from the adhesive layer side toward the first metal portion side to include an optional point of an interface between the first metal portion and the film portion, peaks corresponding to Si—O-Me bonds, which are bonds with a metal element Me constituting the first metal portion, were observed, and a value obtained by dividing a count value of the peaks indicating the Si—O-Me bonds by a total value of all the secondary ion count numbers detected in a mass scanning range m/z=0 to 300 is $1.0 \times 10^{-3}$ or more.

* * * * *